US012217064B2

(12) United States Patent
Bose et al.

(10) Patent No.: US 12,217,064 B2
(45) Date of Patent: Feb. 4, 2025

(54) CORRELATION ENGINE AND POLICY MANAGER (CPE), METHOD AND COMPUTER PROGRAM PRODUCT

(71) Applicant: RAKUTEN MOBILE, INC., Tokyo (JP)

(72) Inventors: Jyoti Bose, Mumbai (IN); Mihirraj Narendra Dixit, Tokyo (JP); Surender Singh Lamba, Tokyo (JP); Abhishek Sharma, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 585 days.

(21) Appl. No.: 17/575,975

(22) Filed: Jan. 14, 2022

(65) Prior Publication Data

US 2023/0229461 A1    Jul. 20, 2023

(51) Int. Cl.
*G06F 9/54* (2006.01)
*G06F 9/445* (2018.01)

(52) U.S. Cl.
CPC ...... *G06F 9/44526* (2013.01); *G06F 9/44505* (2013.01); *G06F 9/542* (2013.01)

(58) Field of Classification Search
CPC ..... G06F 9/542; G06F 16/1734; H04L 41/06; H04L 41/0604
See application file for complete search history.

(56) References Cited

U.S. PATENT DOCUMENTS

| | | | |
|---|---|---|---|
| 2009/0254970 A1* | 10/2009 | Agarwal | G06F 21/554 726/1 |
| 2016/0321308 A1* | 11/2016 | Brinnand | G06F 16/215 |

* cited by examiner

*Primary Examiner* — Andy Ho
(74) *Attorney, Agent, or Firm* — HAUPTMAN HAM, LLP

(57) ABSTRACT

A correlation engine and policy manager (CPE) system includes: a persistent database, a cache database, an event gate, an event enricher, an event transformer, and an event dispatcher. The event gate obtains event data from at least one event source, and forwards the event data to the event enricher. The event enricher enriches the event data with additional data in the cached business layer data of the cache database, and forwards the enriched event data to the event transformer. The event transformer applies one or more policies in a cached business layer data of the cache database to the enriched event data to obtain transformed event data, and outputs the transformed event data to be stored in the persistent database. The event dispatcher dispatches output data to cause or prompt an action responsive to the transformed event data satisfying the at least one policy.

20 Claims, 9 Drawing Sheets

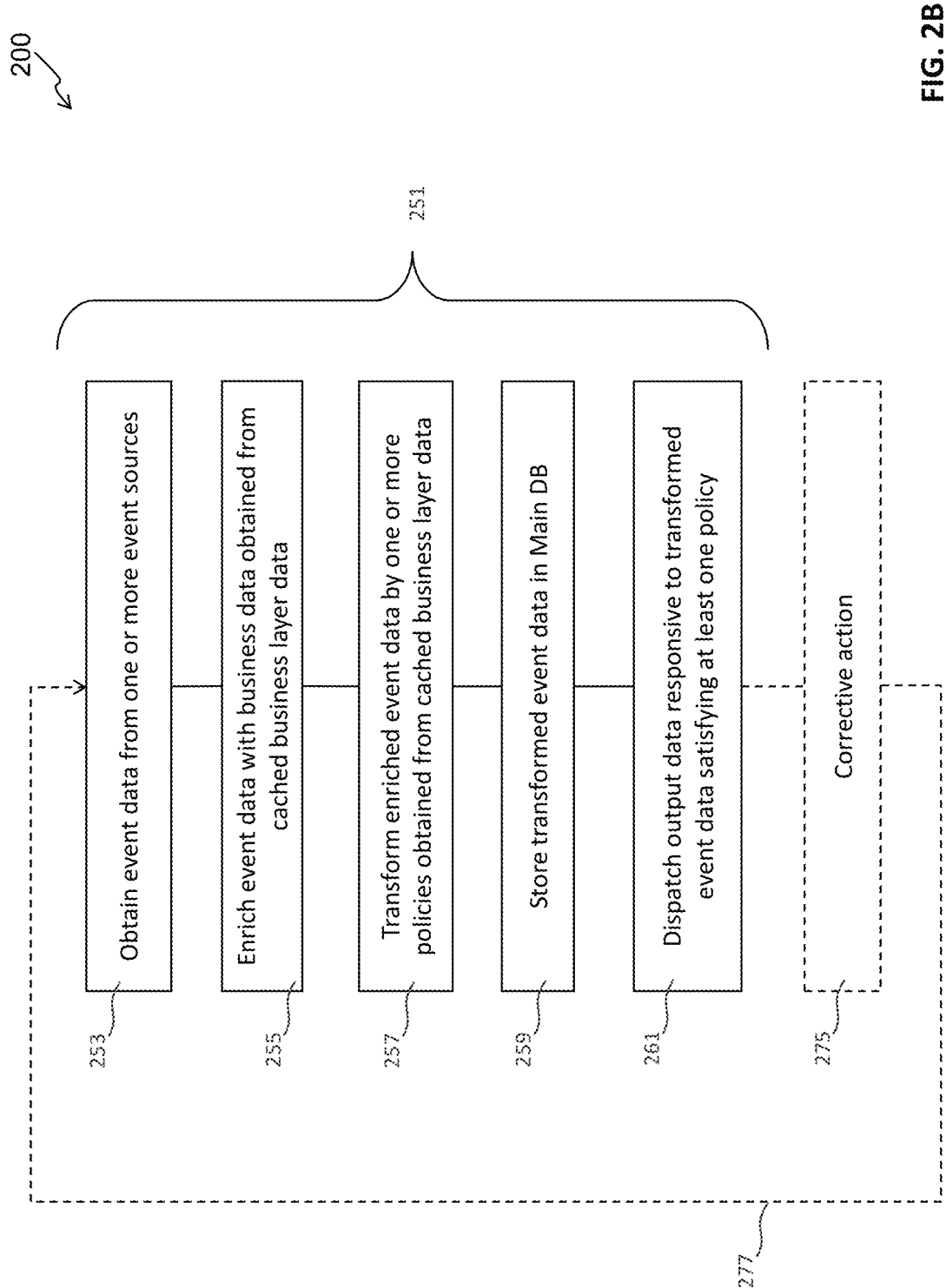

US 12,217,064 B2

CORRELATION ENGINE AND POLICY MANAGER (CPE), METHOD AND COMPUTER PROGRAM PRODUCT

RELATED APPLICATIONS

The instant application is related to the following applications:

- U.S. application Ser. No. 17/644,592, filed Dec. 16, 2021, titled "A PLUGGABLE DATA ADAPTOR," Law Firm No. 6487-041, naming the following inventor(s): Jyoti BOSE, Mihirraj Narendra DIXIT, Surender Singh LAMBA, Abhishek SHARMA,
- U.S. application Ser. No. 17/644,590, filed Dec. 16, 2021 titled "EVENT-DRIVEN ENHANCEMENT OF EVENT MESSAGES," Law Firm No. 6487-045, naming the following inventor(s): Jyoti BOSE, Mihirraj Narendra DIXIT, Surender Singh LAMBA, Abhishek SHARMA,
- U.S. application Ser. No. 17/574,552, filed Jan. 13, 2022 titled "POLICY DRIVEN EVENT TRANSFORMATION," Law Firm No. 6487-063, naming the following inventor(s): Jyoti BOSE, Mihirraj Narendra DIXIT, Surender Singh LAMBA, Abhishek SHARMA, and
- U.S. application Ser. No. 17/644,600, filed Dec. 16, 2021, titled "APPLICATION PROGRAMMING INTERFACE (API) SERVER FOR CORRELATION ENGINE AND POLICY MANAGER (CPE), METHOD AND COMPUTER PROGRAM PRODUCT," Law Firm No. 6487-064, naming the following inventor(s): Jyoti BOSE, Mihirraj Narendra DIXIT, Surender Singh LAMBA, Abhishek SHARMA.

The contents of all of the above-referenced applications are incorporated by reference herein in their entireties.

BACKGROUND

Event-driven architecture (EDA) is a software architecture paradigm promoting the production, detection, consumption of, and reaction to events. When events occur, event messages are generated and/or propagated. The EDA is often designed atop message-driven architectures, where such a communication pattern includes one of the inputs to be text-based (e.g., the message) to differentiate how each communication should be handled.

In computing, being pluggable (or plugin, add-in, addin, add-on, or addon) references a software component that adds a specific feature to an existing computer program. When a program supports plug-ins, the program enables customization. In computing, on the fly, or at run-time, or in runtime, describes a program or a system being changed while the program or system is still running.

BRIEF DESCRIPTION OF THE DRAWINGS

Aspects of the present disclosure are best understood from the following detailed description when read with the accompanying FIGS. In accordance with the standard practice in the industry, various features are not drawn to scale. In fact, the dimensions of the various features be arbitrarily increased or reduced for clarity of discussion.

FIGS. 2A-2B are flow diagrams of one or more processes in a CPE system, in accordance with some embodiments.

DETAILED DESCRIPTION

Figure 1:
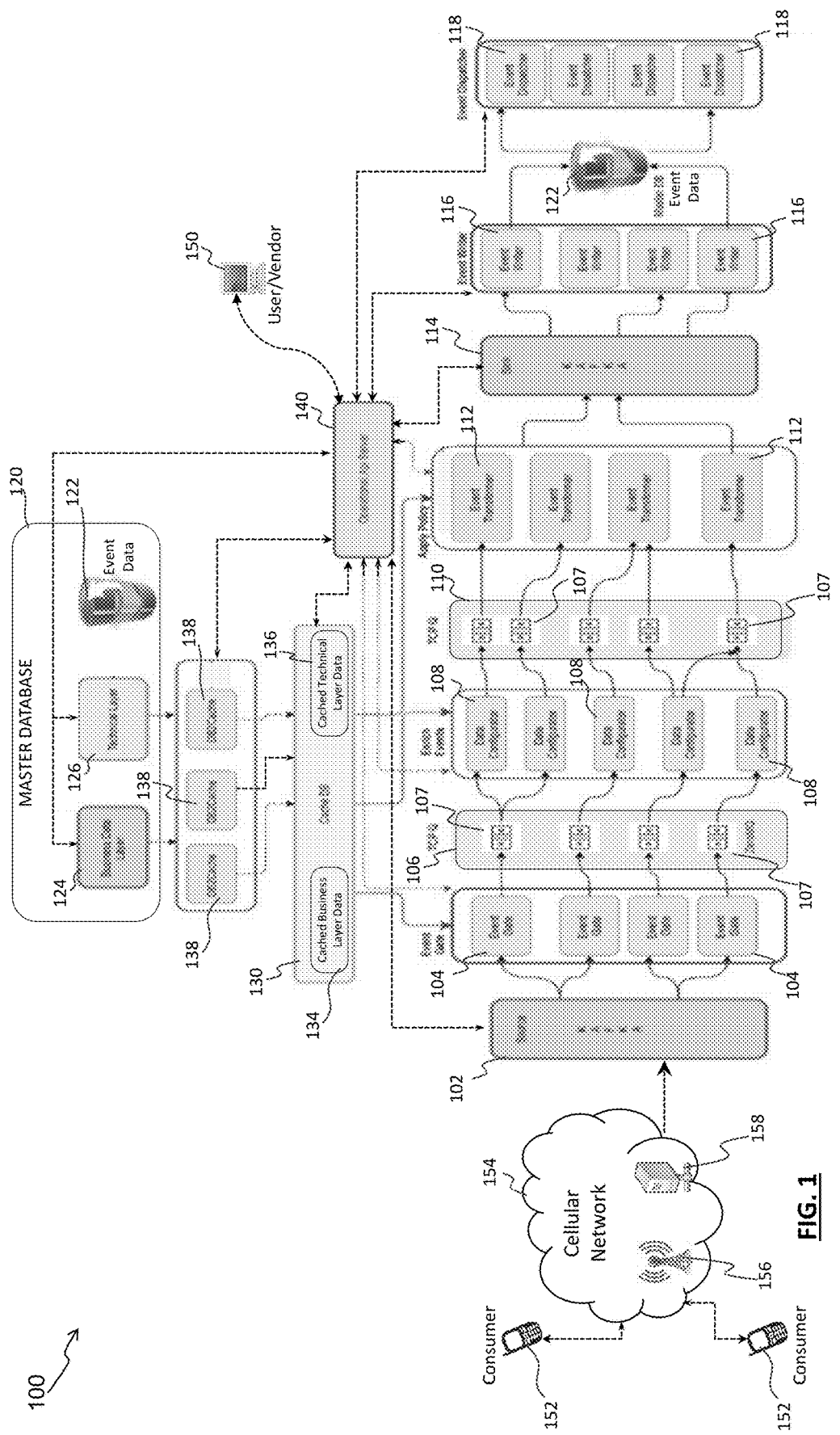
FIG. 1 is a schematic diagram of a correlation engine and policy manager (CPE) system, in accordance with some embodiments.

The following disclosure includes many different embodiments, or examples, for implementing different features of the subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows include embodiments in which the first and second features are formed in direct contact, and also include embodiments in which additional features be formed between the first and second features, such that the first and second features not be in direct contact. In addition, the present disclosure repeats reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, be usable herein for ease of description to describe one element or feature's relationship to another element(s) or feature(s) as illustrated in the FIGS. The spatially relative terms are intended to encompass different orientations of the device in use or operation in addition to the orientation depicted in the FIGS. The apparatus be otherwise oriented (rotated 90 degrees or at other orientations) and the spatially relative descriptors usable herein likewise be interpreted accordingly.

In some embodiments, an event is a notification based message that contains a notification about an entity. In at least one embodiment, an event comprises information or data of the entity.

In some embodiments, event data include data of or about one or more events to be processed, for example, in or by an EDA software and/or system.

In some embodiments, processing performed on event data comprises generation of new data based on the event data, and/or manipulation of the event data. Examples of processing of event data are described herein, in some embodiments with respect to one or more components of a correlation engine and policy manager (CPE) system.

In some embodiments, a configuration of a component comprises a technical and/or technological architecture of the component that permits the component to perform intended processing. For example, a configuration of a component comprises information on one or more modules (e.g., software modules) of the component, how the one or more modules of the component are coupled to each other and/or to other components.

In some embodiments, correlation engine and policy manager (CPE) is a software application that programmatically understands relationships, for example, to aggregate, normalize and analyze event data in accordance with one or more policies set by a user.

In some embodiments, a correlation engine and policy manager (CPE) system comprises a plurality of components of various component types, and each component among the plurality of components is configured to perform at least one corresponding processing on event data input to the CPE system. In one or more embodiments, the CPE system comprises an event gate, an event enricher, an event transformer, and an event dispatcher. The event gate is configured to obtain event data from at least one event source, and forward the event data to the event enricher. The event enricher is configured to enrich the event data with additional data in business layer data, and forward the enriched event data to the event transformer. The event transformer is configured to apply one or more policies in the business layer data to the enriched event data to obtain transformed event data, and output the transformed event data. The event dispatcher is configured to generate and dispatch output data to cause or prompt an action responsive to the transformed event data satisfying at least one policy. In at least one embodiment, the CPE system further comprises a persistent database, a cache database, a database synch module, and a application programming interface (API) server. The persistent database is configured to store the business layer data, technical layer data and the transformed event data. The cache database is configured to store cached business layer data and cached technical layer data, for access by one or more of the other components. The database synch module is configured to synch the cache database and the persistent database. The API server is configured to enable a user or vendor to dynamically update, reconfigure, scale up or down, control, monitor or interact with the CPE system in runtime as per the needs of the user or vendor. In at least one embodiment, components in the CPE system are loosely coupled with each other and comprise common codes which are reused across the architecture.

In some embodiments, the CPE system is a module part of an end-to-end orchestrator. In at least one embodiment, the CPE system acts as a feedback system configured to correlate between source events and alarms, find root causes of the failed entities, and take the corrective decision (or action) to amend the system, thereby automating a closed loop. In some embodiments, one or more advantages is/are obtained, including, but not limited to, low end-to-end latency, easy scaling to improve load balancing, decoupling business layer data and technical layer data with improved time-to-market, built-in advanced auditing, logging, and/or tracing of every event and event frame, reliable end-to-end event flow without loss of data, intelligent routing of the events with improved processing time, integration with an API server for easy monitoring, operations, maintenance, recovery, refresh of business layer data and technical layer data, one system for both real-time and batch processing. Further features and/or advantages are within the scopes of various embodiments.

FIG. 1 is a schematic diagram of a correlation engine and policy manager (CPE) system 100, in accordance with some embodiments.

In some embodiments, a correlation engine is a software application that, when executed in computer hardware, programmatically understands relationships. In some embodiments, correlation engines are included in systems management tools to aggregate, normalize and analyze event data, using predictive analytics and fuzzy logic to alert the systems administrator when there is a problem. In some embodiments, the CPE system 100 is a part of an enterprise software platform running on computer hardware. In at least one embodiment, the CPE system 100 comprises a part in a closed-loop system. An example of a closed-loop system comprises an Observability Framework (OBF) in which data obtained from network elements are sent to the CPE system which acts as a feedback system.

The CPE system 100 comprises a plurality of components including an event source 102, at least one event gate 104, a first event queue 106, at least one event enricher 108 (designated in FIG. 1 as "data configurator"), a second event queue 110, at least one event transformer 112, an event sink 114, at least one event writer 116, at least one event dispatcher 118, a master database 120, a cache database 130, and an operational API server 140. In some embodiments, each of the event source 102, at least one event gate 104, first event queue 106, at least one event enricher 108, second event queue 110, at least one event transformer 112, event sink 114, at least one event writer 116, at least one event dispatcher 118, master database 120, cache database 130, and API server 140 is implemented by one or more computer systems and/or coupled with each other via one or more buses and/or networks as described with respect to FIG. 8, and/or via one or more software buses. In some embodiments, functions and/or operations described herein for the components of the CPE system 100 are implemented by one or more hardware processors executing corresponding software or programs. The event source, event gate, event queue, event enricher, event transformer, event sink, event writer, event dispatcher, master database, cache database, are examples of various component types which may be controlled, configured, scaled, monitored, or interacted with from outside the CPE system 100 by using the API server 140, as described herein.

Specifically, the API server 140 is configured to be coupled to user or vendor equipment 150 (hereinafter user/vendor 150) to enable the user/vendor 150 to perform one or more of controlling, configuring, scaling, monitoring, or interacting with the CPE system 100. In at least one embodiment, the user/vendor 150 is a service provider or business that uses the CPE system 100 to provide and/or handle services, e.g., communication services, to/for consumers (also referred to as clients or end users) of the service provider or business. In the example configuration in FIG. 1, consumers use mobile terminals 152 coupled to a cellular network 154 to receive communication services provided by the user/vendor 150. In an example, the cellular network 154 comprises a plurality of cells (not shown) in which cellular services are provided, through corresponding base stations. A representative base station 156 is illustrated in FIG. 1. The base stations constitute a radio access network, and are coupled to a core network of the cellular network 154. A representative network device 158 of the core network is illustrated in FIG. 1. Examples of the cellular network 154 include, but are not limited to, a long term evolution (LTE) network, a fifth generation (5G) network, a non-standalone (NSA) network, a standalone (SA) network, a global system for mobile communications (GSM) network, a general packet radio service (GPRS) network, a code-division multiple access (CDMA) network, a Mobitex network, an enhanced GPRS (EDGE) cellular network, or the like. Example configurations of the base stations include cell towers each having one or more cellular antennas, one or more sets of transmitter/receivers transceivers, digital signal processors, control electronics, a Global Positioning System (GPS) receiver for timing (e.g., for CDMA2000/IS-95 or GSM systems), primary and backup electrical power sources, and sheltering. Examples of mobile terminals 152, include, but are not limited to, cell phones, tablets, media players, gaming consoles, personal data assistants (PDAs), laptops, and other electronic devices configured to transmit and/or receive cellular communication to/from the base stations of the cellular network 154. An example hardware configuration of a mobile terminal and/or a base station includes a computer system described with respect to FIG. 8, with the addition of one or more cellular antennas and corresponding cellular transceiving circuitry. Examples of communication technologies for performing cellular communications between base stations and mobile terminals include, but are not limited to, 2G, 3G, 4G, 5G, GSM, EDGE, WCDMA, HSPA, CDMA, LTE, DECT and WiMAX. Examples of services provided over cellular communication, herein referred to as cellular communication services, include, but are not limited to, voice calls, data, emails, messages such as SMS and MMS, applications, and control signals. Example components (or network devices) of the core network include, but are not limited to, serving gateways (SGW), high rate packet data serving gateway (HSGW), packet data network gateway (PGW), packet data serving node (PDSN), mobility management entity (MME), home subscriber server (HSS), and policy control rules function (PCRF). The components of the core network are coupled with each other and with the base stations by one or more public and/or proprietary networks. An example hardware configuration of a component or network device 158 of the core network includes a computer system described with respect to FIG. 8. In at least one embodiment, the cellular network 154 is coupled to the CPE system 100 via the Internet, a Virtual Private Network (VPN), or the like.

The event source 102 is configured to perform processing such as receiving or collecting event data. In the example configuration in FIG. 1, the event data collected by the event source 102 comprise events or event messages occurring in the cellular network 154 and/or during communication services of mobile terminals 152. Other sources of events are within the scopes of various embodiments, as described herein.

In some embodiments, an event is recognized by software, often originating asynchronously from the external environment that is handled by the software. Computer event messages are generated or triggered by a system, by an end user, or in other ways based upon the event. Event messages are handled synchronously with the program flow; that is, the software is configured to have one or more dedicated places where event messages are handled; frequently an event loop. An example source of event messages includes an end user, who interacts with the software through the computer's peripherals; for example, by typing on the keyboard or initiating a phone call. Another example source is a hardware device such as a timer. Software is configured to also trigger its own set of event messages into the event loop (e.g., to communicate the completion of a task). Software that changes its behavior in response to event messages is said to be event-driven, often with the goal of being interactive.

In some embodiments, the event messages are collected at the event source 102 via one or more a data stream, batch data, online data, and offline data. A stream is thought of as items on a conveyor belt being processed one at a time rather than in large batches. Streams are processed differently from batch data. Functions may not operate on streams as a whole as the streams have potentially unlimited data; streams are co-data (potentially unlimited), not data (which is finite). Functions that operate on a stream, producing another stream, are known as filters, and are connected in pipelines, analogous to function composition. Filters operate on one item of a stream at a time, or base an item of output on multiple items of input, such as a moving average. Computerized batch processing is processing without end user interaction, or processing scheduled to run as resources permit.

In the example configuration in FIG. 1, the event source 102 comprises one or more message buses. In some embodiments, the one or more message buses comprise one or more Kafka sources. Other source or message bus configurations are within the scopes of various embodiments. Kafka is a framework implementation of a software bus using stream-processing. Kafka is an open-source software platform developed by the Apache Software Foundation written in Scala and Java. Kafka provides a unified, high-throughput, low-latency platform for handling real-time data feeds. Kafka can connect to external systems (for data import/export) via Kafka connect and provides Kafka streams, a Java stream processing library. In some embodiments, the event source 102 is configured to use transport protocols, or network communication channel based protocols to receive or read data. In a specific example, a binary TCP-based protocol is used and optimized for efficiency and on a message-set abstraction that naturally groups messages together to reduce the overhead of the network roundtrip. Other protocols are within the scopes of various embodiments. The message-set abstraction leads to larger network packets, larger sequential disk operations, contiguous memory blocks which allows the event source 102 to turn a bursty stream of random message writes into linear writes. In some embodiments, the event source 102 is configured to read or receive data using a predefined format. In a specific example, confluent kafkaavro.AvroProducer is used. Other formats or ways for reading data are within the scopes of various embodiments. In the example configuration in FIG. 1, the CPE system 100 comprises one event source 102. However, other numbers of event sources are within the scopes of various embodiments. For example, in some embodiments, the event source 102 comprises one or more types of event sources, such as online data sources, offline data sources, streaming data sources, and batch data sources. In some embodiments, the event source 102 is not a part of the CPE system 100, and is maintained or provided by a third party.

The at least one event gate 104 is coupled between the event source 102 and the first event queue 106. As illustrated in FIG. 1, each event gate 104 is coupled between at least one event source 102 and at least one corresponding shared queue 107 of the first event queue 106. The at least one event gate 104 is configured to receive the event data collected by the event source 102. In some embodiments, each event gate 104 is a pluggable data adaptor that connects with multiple types of data sources to collect data, such as event messages, process the event messages into frames, and forward the event data including the event message frame(s) to the at least one event enricher 108. In some embodiments, the event gate 104 is configured to perform processing such as framing collected event messages based on business logic or policies stored in a business layer 124 (also referred to herein as "business data layer") of the master database 120 and provided to the event gate 104 via the cache database 130.

In some embodiments, business layer data in the business layer 124 comprise business data and business logic. In at least one embodiment, the business data comprise data, rather than logic or rules, such as business data related to consumers, as described herein. The business logic (or domain logic) is a part of a software program that encodes the real-world business rules that determine how data is created, stored, and changed. The business logic contains custom rules or algorithms that handle the exchange of information between a database and a user interface. Business logic is the part of a computer program that contains the information (i.e., in the form of business rules) that defines or constrains how a business operates. Such business rules are operational policies that are usually expressed in true or false binaries. Business logic is seen in the workflows that the business logic supports, such as in sequences or steps that specify in detail the proper flow of information or data, and therefore decision-making.

Business logic is contrasted with a remainder of the software program, such as the technical layer or service layer that is concerned with lower-level details of managing a database or displaying the user interface, system infrastructure, or generally connecting various parts of the program. The technical layer is used to model the technology architecture of an enterprise. The technical layer is the structure and interaction of the platform services, and logical and physical technology components.

In some embodiments, the business layer and the technical layer are separated. In some embodiments, at least one, or some, or all components of the CPE system 100, such as the event source 102, event gate 104, first event queue 106, event enricher 108, second event queue 110, event transformer 112, event sink 114, event writer 116, event dispatcher 118, master database 120, cache database 130, support(s) the separation of the business layer and the technical layer. In some embodiments, the separation of the business layer and the technical layer supports quicker implementation of new business use models or rules which reduces the time to implement new business use solutions and reduces the cost of development by allowing code reuse.

In some embodiments, the behavior of at least one, or some, or all components of the CPE system 100, such as the event source 102, event gate 104, first event queue 106, event enricher 108, second event queue 110, event transformer 112, event sink 114, event writer 116, event dispatcher 118, master database 120, cache database 130, is modifiable on the fly, or in runtime, without changing software code or stopping the one or more components, other components, or the whole CPE system 100. In at least one embodiment, the behavior of a component of the CPE system 100 is modifiable by changing one or more policies applicable to the component, as described herein.

In some embodiments, the configuration or number or connections of at least one, or some, or all components of the CPE system 100, such as the event source 102, event gate 104, first event queue 106, event enricher 108, second event queue 110, event transformer 112, event sink 114, event writer 116, event dispatcher 118, master database 120, cache database 130, are modifiable on the fly, or in runtime, without changing software code or stopping the one or more components, other components, or the whole CPE system 100. In at least one embodiment, the configuration or number or connections of a component of the CPE system 100 is/are modifiable by changing configuration data applicable to the component, as described herein. For example, technical layer data stored in a technical layer 126 (also referred to herein as "technical data layer") of the master database 120 are accessible through the cache database 130 and comprise configuration data which define one or more of a number of event gates 104 in the CPE system 100, the configuration of each event gate 104, which and/or how many event sources 102 each event gate 104 is coupled to, which and/or how many event enrichers 108 and/or shared queues 107 in the first event queue 106 each event gate 104 is coupled to, or the like.

As described herein, in some embodiments, based on the business logic, the event gate 104 is configured to group the collected event messages into frames, e.g., to perform event batching. Frames are an artificial intelligence data structure used to divide knowledge into substructures by representing stereotyped situations. Frames are the primary data structure used in artificial intelligence frame language; frames are stored as ontologies of sets. In computer science and information science, an ontology encompasses a representation, formal naming and definition of the categories, properties and relations between the concepts, data and entities that substantiate one, many, or all domains of discourse. An ontology is a way of showing the properties of a subject area and how the properties are related, by defining a set of concepts and categories that represent the subject. Frames are also an extensive part of knowledge representation and reasoning schemes. Structural representations assemble facts about a particular object and event message types and arrange the event message types into a large taxonomic hierarchy. In some embodiments, internal metadata are added by the event gate 104 to the event message frames, rather than to the actual event or event message.

In some embodiments, each event gate 104 is configured to supply the collected and framed event messages to at least one event enricher 108 that enriches the framed event messages with additional related or topological data, and then routes the framed event messages based on a user-defined configuration. The event gate 104 is configured to function as a bridge to exchange data between a data source and a disconnected data class, such as a data set. In some embodiments, this means reading data from a database into a dataset, and then writing changed data from the dataset back to the database. At a simple level, the event gate 104 specifies structured query language (SQL) commands that provide elementary create, read, update, and delete (CRUD) functionality. At a more advanced level, the event gate 104 offers the functions required in order to create strongly typed data sets, including data relations. An example configuration of the event gate 104 is described with respect to FIG. 3.

The first event queue 106 is coupled between the at least one event gate 104 and the at least one event enricher 108. The first event queue 106 is configured to receive the receive the event data including the event message frames output by the at least one event gate 104. In some embodiments, the frames are produced over a messaging queue that uses a transport protocol, or a network communication channel based protocol. In a specific example, a real-time transmission control protocol (TCP) messaging queue (TCP Q) is used as an example of the first event queue 106. Other protocols or messaging queues are within the scopes of various embodiments. Real-time or real time describes operations in computing or other processes that guarantee response times within a specified time (deadline), usually a relatively short time. A real-time process is generally one that happens in defined time steps of maximum duration and fast enough to affect the environment in which the real-time process occurs, such as inputs to a computing system. In computer science, message queues and mailboxes are software-engineering components used for inter-process communication (IPC), or for inter-thread communication within the same process. Message queues use a queue for messaging; the passing of control or of content. In some embodiments, the first event queue 106 is configured to perform processing such as message queueing and/or load balancing between one or more event gates 104 and one or more event enrichers 108.

As illustrated in FIG. 1, the first event queue 106 comprises one or more shared messaging queues 107. Each of the shared queues 107 is coupled between at least one event gate 104 and at least one corresponding event enricher 108. In the specific example configuration in FIG. 1, each shared queue 107 is a ZeroMQ. ZeroMQ is an asynchronous messaging library, aimed at use in distributed or concurrent applications. ZeroMQ provides a message queue, but unlike message-oriented middleware, a ZeroMQ system runs without a dedicated message broker. Other messaging queues are within the scopes of various embodiments. In some embodiments, the technical layer 126 of the master database 120 comprises configuration data which define one or more of a number of shared queues 107 in the first event queue 106, which and/or how many event gates 104 each shared queue 107 is coupled to, which and/or how many event enrichers 108 each shared queue 107 is coupled to, or the like. In some embodiments, the first event queue 106 is entirely or partially omitted. For example, when the first event queue 106, or a part there of, is omitted, at least one event gate 104 is directly coupled to one or more event enrichers 108, in accordance with configuration data of the technical layer 126.

The at least one event enricher 108 is coupled between the first event queue 106 and the second event queue 110. As illustrated in FIG. 1, each event enricher 108 (also referred to as and indicated by "data configurator" in FIG. 1) is coupled between at least one shared queue 107 in the first event queue 106 and at least one corresponding shared queues 107 in the second event queue 110. The at least one event enricher 108 is configured to receive the event data including the event message frames through the first event queue 106. In at least one embodiment, at least one event enricher 108 is configured to receive the event data including event message frames directly from at least one event gate 104. In some embodiments, an event enricher 108 is a daemon service that loads business layer data from the master database 120 and/or the cache database 130. In an Eager mode, the event enricher 108 makes a single query on a database and loads the related entities based upon the query. This is in contrast to Lazy mode that makes multiple database queries to load the related entities. Cache sharing allows each data cache to share the data cache contents with the other caches and avoid duplicate caching.

In some embodiments, the event enricher 108 is configured to perform processing such as applying the loaded business layer data to event message(s) within event message frame(s) received from at least one event gate 104 (either directly, or through the first event queue 106). In some embodiments, the event enricher 108 enriches the event message frame(s) in real time, by supplementing or adding additional business related data from the business layer data. For example, when the event message frame(s) received from at least one event gate 104 includes a telephone number of a consumer, the event enricher 108 enriches the event message frame(s) by adding business data related to the consumer, such as name, address, email, social media account, or the like. In some embodiments, the event enricher compartmentalizes the business layer and the technical layer, where the business layer continues to define new use cases and the technical layer applies those business new use cases in real time on the event message frame(s).

As described herein, the behavior, configuration, number, or connections of the event enricher 108 are modifiable by changing at least one of policies or configuration data applicable to the event enricher 108. For example, one or more policies and/or configuration data applicable to the event enricher 108 define one or more of a number of event enrichers 108 in the CPE system 100, the configuration of each event enricher 108, which and/or how many event gates 104 or shared queues 107 in the first event queue 106 each event enricher 108 is coupled to, which and/or how many event transformers 112 or shared queues 107 in the second event queue 110 each event enricher 108 is coupled to, or the like. An example configuration of the event enricher 108 is described with respect to FIG. 4.

The second event queue 110 is coupled between the at least one event enricher 108 and the at least one event transformer 112. The second event queue 110 is configured to receive the event data including the enriched event message frames output by the at least one event enricher 108. In some embodiments, the second event queue 110 is configured similarly to the first event queue 106, and comprises one or more shared queues 107. As illustrated in FIG. 1, each of the shared queues 107 in the second event queue 110 is coupled between at least one event enricher 108 and at least one corresponding event transformer 112. In some embodiments, the second event queue 110 is configured to perform load balancing between one or more event enrichers 108 and one or more event transformers 112. In some embodiments, the technical layer 126 of the master database 120 comprises configuration data which define one or more of a number of shared queues 107 in the second event queue 110, which and/or how many event enrichers 108 each shared queue 107 in the second event queue 110 is coupled to, which and/or how many event sinks 114 each shared queue 107 in the second event queue 110 is coupled to, or the like. In some embodiments, the second event queue 110 is entirely or partially omitted. For example, when the second event queue 110, or a part there of, is omitted, at least one event enricher 108 is directly coupled to one or more event sinks 114, in accordance with configuration data of the technical layer 126.

In some embodiments, one or more or all of the first event queue 106, event enricher 108, second event queue 110 is/are omitted.

The at least one event transformer 112 is coupled between the second event queue 110 and the event sink 114. In at least one embodiment, the event sink 114 comprises multiple event sinks. As illustrated in FIG. 1, each event transformer 112 is coupled between at least one shared queue 107 in the second event queue 110 and at least one corresponding event sink 114. The at least one event transformer 112 is configured to receive the event data including the enriched event message frames through the second event queue 110. In at least one embodiment, at least one event transformer 112 is configured to receive the event data including enriched event message frames directly from at least one event enricher 108. In some embodiments, the at least one event transformer 112 is configured to perform processing such as listening to events on the second event queue 110, applying at least one policy (e.g., rules) on the event data and the corresponding enriched event message frame, transforming the enriched event message frame applied with the at least one policy, and outputting the event data and the corresponding transformed enriched event message frame to a corresponding partition in the event sink 114 based on the rules applied to the event data. In at least one embodiment, the event transformer 112 is further configured to generate a notification on the corresponding partition. In a specific example, a partition comprises a Kafka topic. Other types of partition are within the scopes of various embodiments. As described herein, the behavior, configuration, number, or connections of the event transformer 112 are modifiable by changing at least one of policies or configuration data applicable to the event transformer 112. For example, one or more policies and/or configuration data applicable to the event transformer 112 define one or more of a number of event transformers 112 in the CPE system 100, the configuration of each event transformer 112, which and/or how many event enrichers 108 or shared queues 107 in the second event queue 110 each event transformer 112 is coupled to, which and/or how many event sinks 114 each event transformer 112 is coupled to, or the like. An example configuration of the event transformer 112 is described with respect to FIG. 5.

The event sink 114 is coupled between the at least one event transformer 112 and the at least one event writer 116. The event sink 114 is configured to perform processing such as receiving and/or collecting the event data including the transformed enriched event message frames output by the at least one event transformer 112. In some embodiments, the event sink 114 is configured similarly to the event source 102, and/or comprises one or more partitions or sinks. In some embodiments, the event data including the corresponding transformed enriched event message frame(s) are sent to a particular event sink based on a routing policy. As described herein, the behavior, configuration, number, or connections of one or more event sources 102 and/or one or more event sinks 114 are modifiable by changing at least one of policies or configuration data applicable correspondingly to the event sources 102 and/or event sinks 114.

The at least one event writer 116 is coupled between the event sink 114 and an event data section 122 of the master database 120. In at least one embodiment, each event writer 116 is coupled to at least one corresponding event sink 114 or topic, to receive the event data including the corresponding transformed enriched event message frames. Each event writer 116 is configured to perform processing such as reading the event data including transformed enriched event message frames from the corresponding topic or event sink 114, and inserting the event data into a corresponding region in the event data section 122. As a result, event data in the same region of the event data section 122 are accumulated or bulked. As described herein, the behavior, configuration, number, or connections of the event writer 116 are modifiable by changing at least one of policies or configuration data applicable to the event writer 116. For example, one or more policies and/or configuration data applicable to the event writer 116 define one or more of a number of event writers 116 in the CPE system 100, the configuration of each event writer 116, which event sink 114 and/or which region in the event data section 122 each event writer 116 is coupled to, or the like. An example configuration of the event writer 116 is described with respect to FIG. 3.

The at least one event dispatcher 118 is coupled to the event data section 122 of the master database 120. In at least one embodiment, each event dispatcher 118 is coupled to a corresponding region in the event data section 122 to read, e.g., at a predetermined interval or per a user request, the event data including the corresponding transformed enriched event message frames. When the event data and/or corresponding transformed enriched event message frames meet a criterion or a condition is triggered, the event dispatcher 118 is configured to perform processing such as invoking a corresponding API function, outputting the event data with or without corresponding metadata and/or business data, or generating a notification or alarm prompting actions to be taken. In an example, an output from the event dispatcher 118 indicates an anomaly or quality degradation in the communication services experienced by a consumer, prompting a corrective action to be taken automatically, or manually by a domain expert, to rectify the issues. An example corrective action includes load rebalancing to remove the anomaly and/or restore the intended quality of communication services experienced by the consumer. As described herein, the behavior, configuration, number, or connections of the event dispatcher 118 are modifiable by changing at least one of policies or configuration data applicable to the event dispatcher 118. For example, one or more policies and/or configuration data applicable to the event dispatcher 118 define one or more of a number of event dispatchers 118 in the CPE system 100, the configuration of each event dispatcher 118, which region of the event data section 122 and/or when the region is to be accessed by each event dispatcher 118, or the like. An example configuration of the event dispatcher 118 is described with respect to FIG. 3.

In at least one embodiment, one or more of components of the CPE system 100, such as the event source 102, event gate 104, first event queue 106, event enricher 108, second event queue 110, event transformer 112, event sink 114, event writer 116, event dispatcher 118 reuse at least partially the same programming codes. In at least one embodiment, one or more components of the CPE system 100 is/are pluggable in nature. In at least one embodiment, one or more components of the CPE system 100 is/are scalable and configured to be scaled in every use and/or in runtime. In some embodiments, it is possible to change a flow of the event data through various components of the CPE system 100. For example, an initial flow of event data is from an event gate 104, through an event enricher 108, to an event transformer 112. By changing a configuration or configurations of one or more of event gate 104, event enricher 108, event transformer 112, the flow of event data is changed to a direct flow from the initial event gate 104 (or a different event gate 104) to the initial event transformer 112 (or a different event transformer 112), without passing through any event enricher 108. Other arrangements for changing event data flows are within the scopes of various embodiments.

As described herein, the master database 120 (also referred to herein as "persistent database") comprises the event data section 122, the business layer 124, and the technical layer 126. For drawing simplicity, the event data section 122 has two corresponding illustrations in FIG. 1; however, both illustrations indicate the same event data section 122. The event data section 122 stores the event data received through the event source 102, together with metadata and/or transformed enriched event message frames added and/or grouped by one or more of the event gate 104, event enricher 108, second event queue 110.

The business layer 124 contains business layer data defined or input by the user/vendor 150 through the API server 140. The business layer data, as described herein, comprises various policies applicable to one or more components of the CPE system 100 and/or business data to be added to the event data received through the event source 102. In some embodiments, the policies or business logic define how event data are processed, grouped, enriched, transformed, stored in and/or output from the event data section 122. In some embodiments, the master database 120 comprises multiple business layers 124 each corresponding, for example, to a different user/vendor.

Example rules defined in the business logic or policies include, but are not limited to, unordered-threshold-based rules, unordered-time-based rules, ordered rules, schedule-based rules, or the like. An example unordered-threshold-based rule includes a policy condition that NodeDown>=1 and NodeNotReady>=0 with a hold time of 10 min. In this rule, it is not necessary to wait for the entire hold time, i.e., once the thresholds are exceeded, a trigger is generated. An example unordered-time-based rule includes a policy condition that F1SctpFailure>1 and F1SctpSuccess<1 with a hold time of 10 min. In this rule, the system waits for the for the entire hold time and if the condition is still satisfied, a trigger is generated. An example ordered rule includes a policy condition that Event_Pod_Failure followed by Event_Pod_Restarted. In this rule, when the order of events matches the condition, a trigger is generated. An example schedule-based rule includes a policy condition that Every Tuesday at 10 pm, take X action. In this rule, actions are taken based on a schedule rather than on events. In some embodiments, the described rules are applied by at least one event transformer 112.

While the business layer 124 defines behavior of the CPE system 100, the technical layer 126 contains technical layer data (also referred to herein as "technical data" or "configuration data") which define size and/or shape of the CPE system 100, in accordance with inputs from the user/vendor 150. For example, as described herein, the configuration data in the technical layer 126 define the number of each component type (e.g., the number of event gates 104), the configuration of each component, and/or how the components of the CPE system 100 are coupled to each other as described herein. In some embodiments, the master database 120 comprises multiple technical layers 126 each corresponding, for example, to a different user/vendor. In some embodiments, the entire configuration and/or behavior of the CPE system 100 are determined and/or customizable by the user/vendor 150 who inputs the desired business layer data and configuration data into the master database 120 through the API server 140.

The cache database 130 contains cached versions of the business layer data and technical layer data stored in the master database 120. In computing, a cache is a hardware or software component that stores data so that future requests for that data can be served faster. The data stored in a cache is the result of an earlier computation or a copy of data stored elsewhere. Cache hits are served by reading data from the cache, which is faster than re-computing a result or reading from a slower data store; thus, the more requests that are served from the cache, the faster the system performs. Example caches include, but are not limited to, an internal cache, a query cache, or the like. An internal cache keep results ready that the internal cache thinks the user might need based on usage patterns. A query cache stores results when a query is made more than once (e.g., for a configuration file for a component of the CPE system 100) and the result is cached and returned from a memory, e.g., a random access memory (RAM). When the RAM runs out, the least recently used query is deleted to make space for new ones. When the underlying data changes, either on a table or row/document level, depending on the database, the cache is cleared.

In the example configuration in FIG. 1, the cache database 130 comprises cached business layer data 134 (also referred to as "cached business layer data") and cached technical layer data 136 (also referred to as "cached technical layer data"). The cached business layer data 134 is a cached version of at least a portion, or the entirety, of the business layer data in the business layer 124. The cached technical layer data 136 is a cached version of at least a portion, or the entirety, of the technical layer data in the technical layer 126. The cache database 130 is coupled to other components in the CPE system 100 to provide the corresponding business data, policies and configuration data to the other components to control the behaviors and/or configurations of the other components. In the example configuration in FIG. 1, for simplicity, the cache database 130 is illustrated as being coupled to the event gate 104, event enricher 108, event transformer 112. However, in one or more embodiments, the cache database 130 is also coupled to one of the other components, such as one or more of the event source 102, first event queue 106, second event queue 110, event sink 114, event writer 116, event dispatcher 118. In at least one embodiment, the cache database 130 improves processing speed, as described herein.

The cached business layer data 134 and/or cached technical layer data 136 are synched with the business layer data and technical layer data of the master database 120 by one or more DB2Cache (database-to-cache, or database synch) modules 138. In some embodiments, the DB2Cache modules 138 are part of the cache database 130. In at least one embodiment, the DB2Cache modules 138 are independent from the cache database 130. The DB2Cache modules 138 are implemented by one or more hardware processors executing corresponding software or programs. In at least one embodiment, the number of DB2Cache modules 138 corresponds to a caching speed at which the business layer data and technical layer data are cached from the master database 120 into the cache database 130. For example, the higher the number of DB2Cache modules 138, the higher the caching speed. In some embodiments, the number of DB2Cache modules 138 is configurable by user input received through the API server 140. In at least one embodiment, the number of DB2Cache modules 138 is automatically controllable, e.g., depending on the amount of data to be cached. Example modes of operation of the DB2Cache modules 138 include, but are not limited to, an incremental mode, a by-request mode, a full mode, or the like. In the incremental mode, the DB2Cache modules 138 are configured to monitor the master database 120 for new data and, when new data are detected, load the new data into the cache database 130. In the by-request mode, the DB2Cache modules 138 are configured to patch the cache database 130 and/or the master database 120 in response to user input, for example, received through the API server 140. In the full mode, the DB2Cache modules 138 are configured to clean the entire cache database 130, and load all business layer data and technical layer data again from the master database 120. Other configurations of the DB2Cache modules 138 and/or cache database 130 are within the scopes of various embodiments. An example configuration of the DB2Cache module (database synch module) 138 is described with respect to FIG. 6.

The API server 140 is coupled between the user/vendor 150 on one hand, and the other components of the CPE system 100 on the other hand. An API is a connection between computers or between computer programs. API is a type of software interface, offering a service to other pieces of software. The API server 140 is configured to receive one or more of controls, business layer data, technical layer data from the user/vendor 150. The API server 140 is coupled to the other components of the CPE system 100. In some embodiments, the API server 140 is configured to control, in runtime, the other components of the CPE system 100 in accordance with controls received from the user/vendor 150. In some embodiments, the API server 140 is configured to provide the user-defined business layer data and technical layer data from the user/vendor 150 to the corresponding business layer 124 and technical layer 126 in the master database 120. The user-defined business layer data and technical layer data are cached in the corresponding cached business layer data 13, cached technical layer data 136 of the cache database 130. The other components of the CPE system 100, such as one or more of the event source 102, event gate 104, first event queue 106, event enricher 108, second event queue 110, event transformer 112, event writer 116, event dispatcher 118 are configured to obtain the corresponding policies, business data and configuration data from the cache database 130, and apply the corresponding policies, business data and configuration data to process the event data and/or to configure the components, as described herein.

In some embodiments, the API server 140 is a centralized API server configured to control or configure the CPE system 100 system in runtime in response to inputs from the user/vendor 150, as per the needs of the user/vendor 150. In at least one embodiment, the entire configuration and/or operation of the CPE system 100 is/are controllable and/or customizable by the user/vendor 150 through the API server 140. This advantage is not observable in other approaches. In at least one embodiment, it is possible for more than one user/vendors 150 to use and share control/configuration of the CPE system 100, e.g., by receiving through the API server 140 several sets of business layer data and technical layer data each from one of the user/vendors 150, and by configuring/controlling the CPE system 100 correspondingly based on the user-defined sets of business layer data and technical layer data. An example configuration of the API server 140 is given with respect to FIG. 7.

In some embodiments, the CPE system 100 is a software application that programmatically understands relationships. CPE is used in systems management tools to aggregate, normalize and analyze event log data, using predictive analytics and fuzzy logic to alert the systems administrator when there is a problem. In some embodiments, CPE is a part of an event-driven architecture (EDA) or service-oriented architecture (SOA) platform.

An EDA architectural pattern is applied by the design and implementation of applications and systems that transmit event messages among loosely coupled software components and services. An event-driven system includes event emitters (or agents, data sources), event consumers (or sinks), and event channels (or the medium the event messages travel from emitter to consumer). Event emitters detect, gather, and transfer event messages. An event emitter may not know the consumers of the event messages, the event emitter may not even know if an event consumer exists, and in case the event consumer exists, the event emitter may not know how the event message is used or further processed. Event consumers apply a reaction as soon as an event message is presented. The reaction is or is not completely provided by the event consumer. For example, the event consumer filters the event message frame(s) while the event formatter and router transforms and forwards the event message frame(s) to another component or the event consumer supplies a self-contained reaction to such event message frame(s). Event channels are conduits in which event message frame(s) are transmitted from event emitters to event consumers. In some embodiments, event consumers become event emitters after receiving event message frame (s) and then forwarding the event message frame(s) to other event consumers. The configuration of the correct distribution of event message frame(s) is present within the event channel. The physical implementation of event channels is based on components, such as message-oriented middleware or point-to-point communication, which might rely on a more appropriate transactional executive framework (such as a configuration file that establishes the event channel).

Enterprise software, further known as enterprise application software (EAS), is one example of EDA software. EAS is computer software used to satisfy needs of an organization rather than individual consumers. Such organizations include businesses, schools, interest-based user groups, clubs, charities, and governments. Enterprise software is a part of a (computer-based) information system; a collection of such software is called an enterprise system. These systems handle a chunk of operations in an organization with the aim of enhancing the business and management reporting tasks. The systems process the information at a relatively high speed and deploy the information across a variety of networks. Services provided by enterprise software are business-oriented tools, such as online shopping, and online payment processing, interactive product catalogue, automated billing systems, security, business process management, enterprise content management, information technology (IT) service management, customer relationship management, enterprise resource planning, business intelligence, project management, collaboration, human resource management, manufacturing, occupational health and safety, enterprise application integration, and enterprise forms automation.

Event-driven service-oriented architecture (SOA) combines the intelligence and proactiveness of EDA with the organizational capabilities found in service offerings. An SOA platform orchestrates services centrally, through pre-defined business processes, assuming that what should have already been triggered is defined in a business process. Other approach does not account for event message frame(s) that occur across, or outside of, specific business processes. Thus, complex event message frame(s), in which a pattern of activities, both non-scheduled and scheduled, are not accounted for in other approaches, in contrast to one or more embodiments. Other EDA or SOA approaches are not configured to support a single solution for several or multiple types of data, data collectors, or data sources, in contrast to one or more embodiments. Further, other EDA or SOA approaches do not support collecting data in both data streams and in batch data, in contrast to one or more embodiments. Other EDA or SOA approaches do not have a business layer to group data based on business logic, in contrast to one or more embodiments.

Figure 2A:
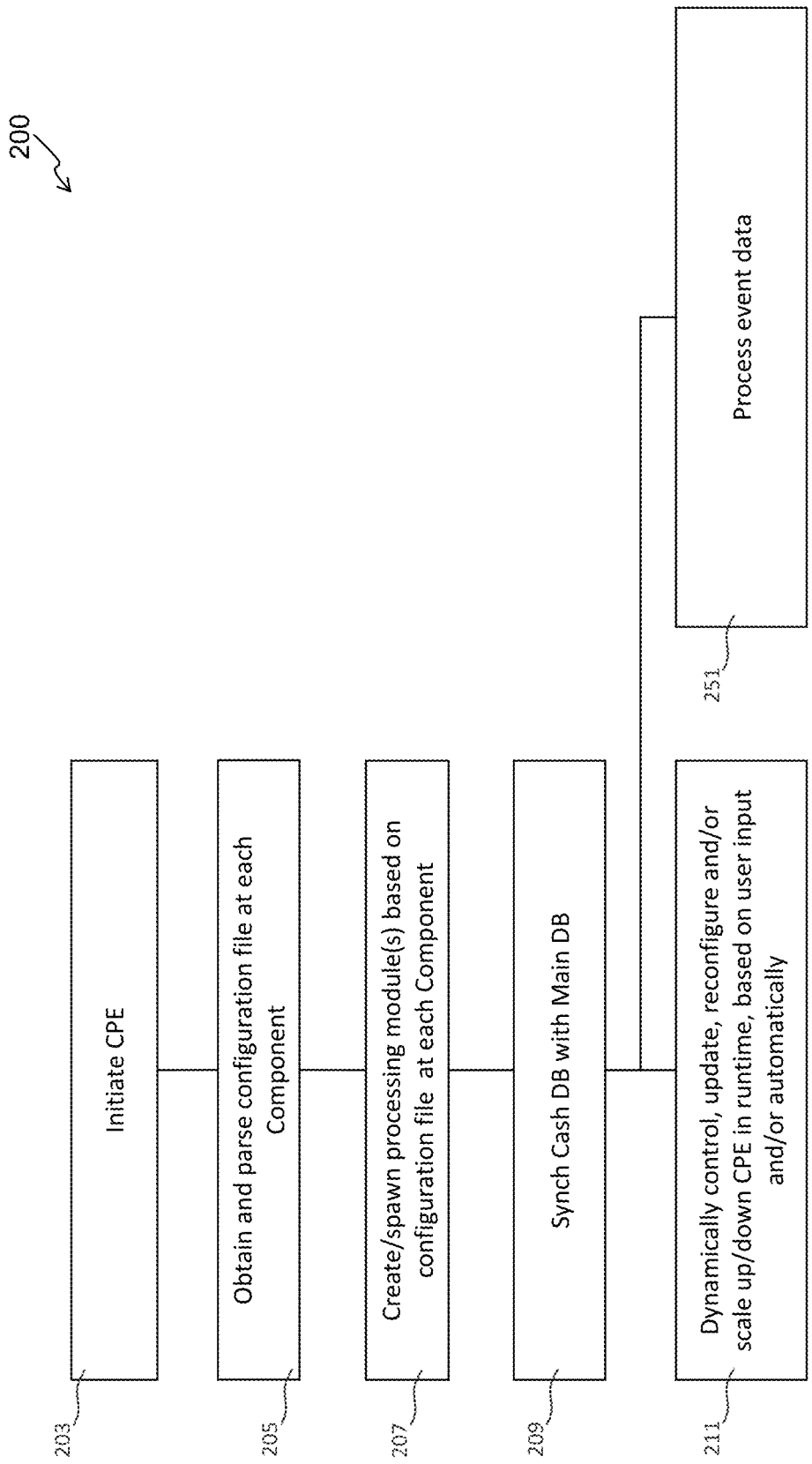

FIG. 2A is a flow diagram of a process 200 in a CPE system, in accordance with some embodiments. FIG. 2B is a flow chart of a part of the process 200, in accordance with some embodiments. In at least one embodiment, the process 200 is performed at or by the CPE system 100. As shown in FIG. 2A, the process 200 comprises operations 203, 205, 207, 209, 211, 251, in one or more embodiments.

At operation 203, the CPE system is initiated. In some embodiments, the initiation of the CPE system 100 comprises initiation of each of a plurality of components of the CPE system. For example, as described with respect to FIGS. 3-6, when a component, e.g., an event gate, event enricher, event transformer, event writer, event dispatcher, database synch module, or the like, is initiated, a configuration parser module and an invoke worker module of the component are spawned or initiated. In at least one embodiment, when a component, e.g., an event enricher or event transformer, is initiated, a cache loader module (also referred to as Eager cache loader module) is also spawned or initiated to obtain additional data and/or policies from the business layer data, as described with respect to FIGS. 4-5.

At operation 205, the configuration parser module of each initiated component obtain and parse a configuration file corresponding to the component, as described with respect to FIGS. 3-6. In some embodiments, the configuration file obtained and parsed the first time the component is initiated is built in the component, or is obtained from a persistent database, e.g., the master database 120, or from a cache database 130 where the cache database 130 already stores cached technical layer data of the master database 120. Subsequently, the configuration parser module updates the configuration file by accessing the cache database 130, or when an updated configuration file is pushed to the configuration parser module from one of the databases and/or the API server 140. As a result, it is possible to reconfigure, scale up or scale down each component in particular, or the CPE system as a whole, as described with respect to FIGS. 3-7.

At operation 207, the invoke worker module of each initiated component creates or spawns one or more processing modules, based on the configuration file obtained and parsed by the configuration parser module, as described with respect to FIGS. 3-6. For example, a type, configuration, and/or number of the processing modules are defined in the configuration file. As a result, by simply updating the configuration file, it is possible to reconfigure, scale up or scale down each component or the whole CPE system in runtime. Each component has a different type of processing modules. For example, for an event gate, the corresponding processing module(s) comprise(s) one or more event gate modules, as described with respect to FIG. 3. For an event enricher, the corresponding processing module(s) comprise(s) one or more event consumer modules and corresponding event formatter and router modules, as described with respect to FIG. 4. For an event transformer, the corresponding processing module(s) comprise(s) one or more event consumer modules and corresponding event policy executer and producer modules, as described with respect to FIG. 5. For an event writer, the corresponding processing module(s) comprise(s) one or more event writer modules, as described with respect to FIG. 3. For an event dispatcher, the corresponding processing module(s) comprise(s) one or more event dispatcher modules, as described with respect to FIG. 3. For a database synch module, the corresponding processing module(s) comprise(s) one or more database consumer modules, as described with respect to FIG. 6. Some processing modules, such as those for an event enricher or an event transformer, are configured to use business layer data obtained by the corresponding cache loader module from the cache database 130, as described with respect to FIGS. 4-5. In some embodiments, the number of event gates 104 described with respect to FIG. 1 corresponds to the number of spawned event gate modules, the number of event enrichers 108 described with respect to FIG. 1 corresponds to the number of spawned event formatter and router modules, the number of event transformers 112 described with respect to FIG. 1 corresponds to the number of spawned event policy executer and producer modules, the number of event writers 116 described with respect to FIG. 1 corresponds to the number of spawned event writer modules, the number of event dispatchers 118 described with respect to FIG. 1 corresponds to the number of spawned event dispatcher modules, and the number of DB2Cache modules 138 described with respect to FIG. 1 corresponds to the number of spawned database synch modules. In at least one embodiment, the invoke worker module of a component in the CPE system further creates or spawns one or more of an event logger module, a disqualification (DLQ) consumer module, a file writer module, as described with respect to one or more of FIGS. 3-5.

At operation 209, the cache database 130 is synched with the master database 120, for example, by one or more of the DB2Cache modules 138. In some embodiments, the cache database 130 already contains cached business layer data and/or cached technical layer data, and operation 209 is omitted. The cache database 130 is nevertheless synched with the master database 120 during further operation 211 and/or operation 251.

At operation 211, one or more of controlling, updating, reconfiguring and/or scaling up/down the CPE system in runtime is performed, based on user input and/or automatically. Examples of controlling, updating, reconfiguring and/or scaling up/down the CPE system in runtime in response to user input are described with respect to FIG. 7. Examples of automatic controlling, updating, reconfiguring and/or scaling up/down the CPE system comprise automatic load balancing when additional processing modules are spawned, or unused or underused processing modules are paused (suspended) or terminated.

At operation 251, event data input into the CPE system are processed, as described with respect to FIG. 2B. In some embodiments, processed in operation 211 and processed in operation 251 are interleaved, performed in parallel or in sequence. The described order of operations in the process 200 is an example. Other operations and/or operation orders are within the scopes of various embodiments.

As shown in FIG. 2B, event data processing operation 251 comprises operations 253, 255, 257, 259, 261, in one or more embodiments. Event data processing operation 251 is performed by the processing modules spawned at operation 207 for each component, and involves business layer data obtained from the cache database 130 as described herein.

At operation 253, event data are obtained from one or more event sources, for example, by at least one event gate 104. As described herein, each event gate 104 is a pluggable data adaptor that connects with multiple types of data sources to collect data, such as event messages, process the event messages into frames, and forward the event data including the event message frame(s) to at least one event enricher 108, e.g., through one or more shared queues 107 in a first event queue 106. Each event consumer module in the event gate 104 is configured in accordance with the configuration file obtained and parsed by the corresponding configuration parser module of the event gate 104. In one or more embodiments, the configuration file defines the number of events to be grouped in an event message frame(s) or the size of an event message frame(s). In an example, the configuration requires checking events which have happened in the last, e.g., 60 seconds. Then, every minute, the event gate 104 will group all events occurring in the last minute and in one event message frame(s). In another example, an event message frame(s) may include a single event.

As operation 255, the event enricher 108 enriches the event data with additional data in the cached business layer data 134 of the cache database 130, and forward the enriched event data to at least one event transformer 112, e.g., through one or more shared queues 107 in a second event queue 110. As described herein, in some embodiments, the event enricher 108 enriches the event message frame(s) in real time, by supplementing or adding additional business related data from the cached business layer data 134 as obtained by the corresponding cache loader module. For example, when the event message frame(s) received from at least one event gate 104 includes a telephone number of a consumer, the event enricher 108 enriches the event message frame(s) by additional data related to the consumer, such as name, address, email, social media account, or the like. In some embodiments, the additional data comprises information about one or more policies to be applied to the event data by the event transformer 112. In at least one embodiment, the additional data are added to the event message frame(s) and the enriched event data, i.e., the event message frame(s) with the added additional data and containing event messages, are output to the second event queue 110 for access by the event transformer 112.

At operation 257, the event transformer 112 applies one or more policies in the cached business layer data 134 of the cache database 130 to the enriched event data, to obtain transformed event data, and output the transformed event data to, e.g., the event sink 114, to be subsequently stored in the persistent database 120 by at least one event writer 116. In an example, and as also described with respect to FIG. 5, the invoke worker module of the event transformer 112 reads the configuration file obtained and parsed by the corresponding configuration parser module of the event transformer 112, and knows the number and configuration of event consumer modules and corresponding event policy executer and producer modules to be spawned. The event consumer modules are then spawned and attached each to one corresponding event policy executer and producer module. Related business layer data, such as one or more policies to be applied to the enriched event data, are obtained by the cache loader module of the event dispatcher 118 from the cached business layer data 134 and provided to the event policy executer and producer modules. In some embodiments, the cache loader module is a process which keeps replicating itself from the cache database 130.

Each of the event consumer modules of the event transformer 112 has a configuration defined by the configuration file parsed by the corresponding configuration parser module. The configuration determines, for example, from which shared queue an event consumer module has to receive an event and/or whether the event consumer module has to receive one event or to receive multiple events. Therefore, in one or more embodiments, the event consumer module knows when it attaches itself to the queue that it has to read one single event or it has to read multiple events in a time window (also defined by the configuration). When the event consumer module has to read a single event, the event consumer module makes that single event available to the corresponding event policy executer and producer module. When the event consumer module has to read multiple events in a time window, the event consumer module groups the read events and makes the event group available to the corresponding event policy executer and producer module.

When the event policy executer and producer module receives the single event or the event group, the event policy executer and producer module checks the additional data included by the event enricher 108 for information about one or more policies to be applied to the enriched event data. Based on the information, the event policy executer and producer module obtains the corresponding one or more policies (e.g., rules) from the cached business layer data 134 through the corresponding cache loader module of the event transformer 112. The obtained policies (or rules) are then applied by the event policy executer and producer module to the event data. For example, a policy to be applied indicates when events A, B and C occur, rule R1 is to be applied. In this example, the event policy executer and producer module checks whether events A, B and C are all included in the event message frame(s) or not. If events A, B and C are all included in the event message frame(s), the event policy executer and producer module applies rule R1 (e.g., a sum of events A, B and C), adds the result (e.g., the sum of event A, B and C) of the application of rule R1 to the event message frame(s) to obtain the transformed event data. The transformed event data are then output to the event sink 114. In at least one embodiment, each event policy executer and producer module handles one event message frame(s) at a time. It is possible that multiple rules or policies are applied to the event(s) in one event message frame(s). It is also possible that on rule or policy is applied to multiple event message frames.

In some embodiments, an event logger module of the event transformer 112 maintains a log of one or more information including, but not limited to, events, event message frames, sizes of the event message frames, kinds of the event message frames, configurations parsed by the configuration parser module, business layer data obtained by the cache loader module, or the like. A file writer module records the log in a file, e.g., for debugging, or monitoring, through the API server 140. In some embodiments, the log file is kept locally with the event transformer 112 and once the log file reaches a certain size, new log information is written over the old log information. In some embodiments, the description given with respect to various modules of the event transformer 112 is applicable to corresponding modules of the other components of the CPE system.

At operation 259, the transformed event data are read from the event sink 114 and stored in the master database 120, e.g., by at least one event writer 116. In some embodiments, the event writer 116 is configured to just write the transformed event data, i.e., event message frames with the decision or result of rule application added by the event transformer 112, from the event sink 114 to the master database 120.

At operation 261, at least one event dispatcher 118 is configured to, in response to the transformed event data in the master database 120 satisfying at least one policy, generate and dispatch output data to cause or prompt an action responsive to the transformed event data satisfying the at least one policy. In some embodiments, the event dispatcher 118 is configured, e.g., by a configuration file obtained and parsed by the corresponding configuration parser module, to periodically access, or continuously synchronize with, the master database 120 and search for event message frames with the decision or result of rule application added by the event transformer 112. In an example when the event transformer 112 applies one or more policies to the events in an event message frame but the events in the event message frame do not satisfy the applied policies, then the event message frame is written to the master database 120 without a decision of rule application. Such event message frames are ignored by the event dispatcher 118. In further examples, if events in an event message frame(s) satisfy at least one of the applied policies, then a decision of rule application is added to the event message frame(s) and the event dispatcher 118 will locate such event message frames, and dispatch output data corresponding to the event message frames with the decision of rule application to an intended recipient.

In one or more embodiments, the output data dispatched by the event dispatcher 118 comprise a notification added by the event transformer 112 as a decision or result of rule application. For example, when a certain sequence of events in an event message frame is satisfied, the event transformer 112 adds to the event message frame a notification that a node in a cellular network is to be restarted, and the event dispatcher 118 dispatches such notification to a user, e.g., through the API server 140. In one or more embodiments, the notification is dispatched to a process that automatically restarts the node without user intervention. The described notification serves as an example of output data dispatched by the event dispatcher 118 to cause (e.g., automatic restart) or prompt (e.g., through API server 140 and for user's decision whether to restart the node) an action (e.g., restart) responsive to the transformed event data satisfying at least one policy.

In at least one embodiment, the output data is dispatched through the API server 140 to a user in the form of an alarm corresponding to the notification added by the event transformer 112. In some embodiments, the notification also includes the destination of the intended recipient. For example, when there are multiple users and/or systems that may receive notifications from the CPE system 100, the event transformer 112 adds the intended recipient (user and/or system) of the result/decision of a satisfied policy to the notification, so that the event dispatcher 118 knows where to dispatch that notification or corresponding output data.

In some embodiments, the event dispatcher 118 operates in real time, i.e., the event dispatcher 118 dispatches corresponding output data or notification in response to an event message frame with a decision or result of rule application being found in the master database 120. In some embodiments, the event dispatcher 118 operates in a batch processing. For example, a user may enter, e.g., through the API server 140, a rule asking to compare today's event data with yesterday's event data. The event dispatcher 118 then looks into the master database 120, and since all the events coming and getting processed are stored in the master database 120, the event dispatcher 118 can compare the today's event data with yesterday's event data (or event data from any previous time period) as required by the rule. In another example, the user may notice that there is a spike in demand at a certain day of a month of week, and the user may add a rule, e.g., through the API server 140, to compare the demand spike at the same day in different months or weeks for troubleshooting and/or network optimization.

As operation 275, a corrective action is taken in response to the output data dispatched by the event dispatcher 118. The corrective action may be automatic or in response to user input. For example, as described herein, a corrective input may comprises restarting a node in a cellular or communications network, which causes the communications network to change its operation, resulting in new event data being generated or collected from the communications network. The new event data are collected at one or more event sources and fed to the CPE system 100 for processing, as schematically illustrated in FIG. 2B by arrow 277. As a result, the CPE system 100 is configured to operate in a closed loop feedback manner. The described corrective action being a node restart is just an example. Other corrective actions are within the scopes of various embodiments. In an example, multiple corrective actions are contemplated, e.g., if a certain number of node restarts does not solve an issue, the load of the node is migrated to different hardware.

In some embodiments, an event enricher in the CPE system is configured to perform enrichment only, and is not affected by source schema, scheme validation or schema translation. A reason is that the event enricher is separate from an event gate which is adaptable or pluggable to handle various types of sources. The described features and/or advantages are not observable in other approaches where an enricher is tightly coupled with a data source, and requires code modification when the source scheme changes.

In some embodiments, data required for enrichment and/or transformation are fetched from a cache database. This arrangement permits the CPE system to operate even if data layers are changed in the future. In at least one embodiment, multiple data routes are possible. The described features and/or advantages are not observable in other approaches where an enricher depends on an active inventory and requires changes when a data layer is changed. Further, in other approaches, routing from one module to the next module is limited by topology.

In some embodiments, with respect to a correlation engine, a scheduler, which is a requirement of other approaches, is removed based on time windows. In one or more embodiments, multiple analytic capabilities are available to satisfy particular use cases. Examples of analytic capabilities include, but are not limited to, grouping, windowing or the like. Grouping comprises grouping events into an event message frame, or grouping multiple event message frames into a group. Windowing comprises collecting events or event message frames that occur in a specific, predetermined time interval (e.g., every 10 seconds, 30 seconds, 1 minute, or the like). The described features and/or advantages are not observable in other approaches where a scheduler is required, and operations are tightly coupled with single window functionality while grouping is tightly dependent on topology root identification.

In some embodiments, still with respect to a correlation engine, NFAT structure patterns are satisfied fully or partially via python libraries. In at least one embodiment, clustering is not required as the event source and event gate guarantee late event cases can be processed. The described features and/or advantages are not observable in other approaches where NFAT structures are implemented to satisfy most use cases, and clustering is required for late event corner cases.

In some embodiments, the event sink is entirely pluggable. The described feature and/or advantage is not observable in other approaches, which require hard code sink payloads, or, even if a sink is pluggable, an additional interface which is hard coded is still required.

In some embodiments, various features are modifiable or updatable, advantageously in runtime. Examples include, but are not limited to, policies, sources, sinks, data layers, technical layer configurations, or the like. The described features and/or advantages are not observable in other approaches where a policy definition manager is required and is able only to add policies, interfaces, sinks.

In some embodiments, an event gate, which is not found in other approaches, is provided. In one or more embodiments, it is possible to couple the CPE system to new, additional event sources, advantageously in runtime, simply by modifying the configuration of the event gate, or the configuration of an event consumer module thereof, through the API server 140. In at least one embodiment, the event gate is configured to ensure schema validation, and support multiple interfaces as event sources, such as RestApi, Kafka, gRPC, Socket, or the like.

In some embodiments, a cache database is implemented for data caching instead of a Redis data structure used in other approaches. In one or more embodiments, the cache database permits filtering which requires SQL based query structures that cannot be fulfilled by a Redis data structure used in other approaches. In at least one embodiment, an SQL query based cache database, such as Apache Ignite, is used.

In some embodiments, the persistent database is implemented by a PostgreSQL database system. This is different from other approaches which use a MangoDB database.

In some embodiments, the use of a cache database provides improved data fetching speed. This is different from other approaches in which API calls are slow which, in turn, slow down the whole system.

In some embodiments, as an event queue or an event bus, ZeroMQ is used for fast speed and low latency. This is different from other approaches in which Kafka queues are used internally. Other configurations and/or advantages are within the scopes of various embodiments.

Example configurations of various components of the CPE system 100 are further described below.

Figure 3:
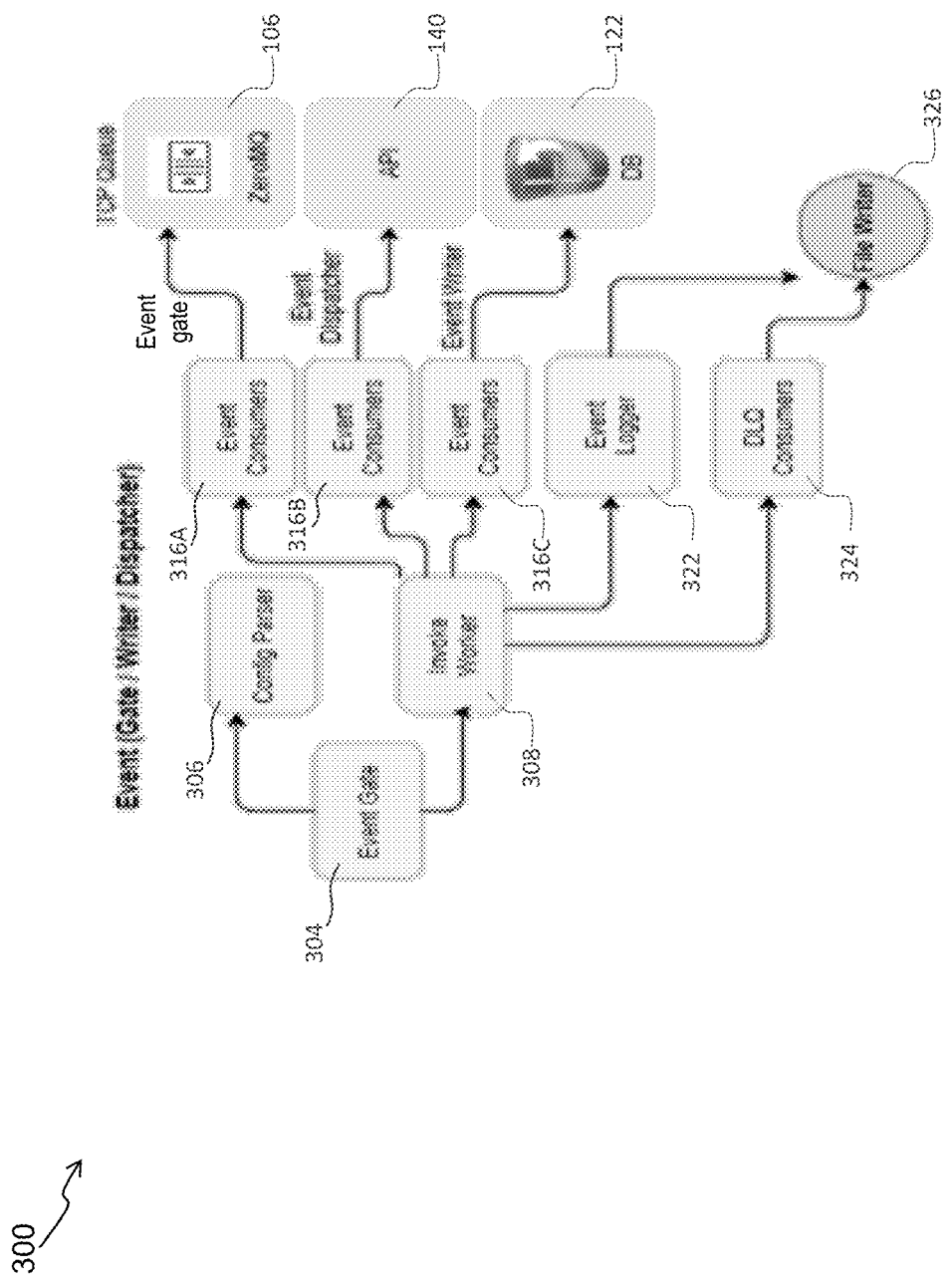
FIG. 3 is a schematic diagram of a component corresponding to an event gate, an event writer, or an event dispatcher, in a CPE system, in accordance with some embodiments.

FIG. 3 is a schematic diagram of a component 300 corresponding to an event gate, an event writer, or an event dispatcher, in a CPE system, in accordance with some embodiments. Corresponding elements in FIGS. 1 and 3 are designated by the same reference numerals. In some embodiments, the component 300 corresponds to the event gate 104, the event writer 116 or the event dispatcher 118 in the CPE system 100. In at least one embodiment, the component 300 is implemented as software executed by at least one hardware processor. The schematic diagram in FIG. 3 shows the hierarchy of various modules in the component 300.

The component 300 comprises a main module 304 that is executed when the component 300 is initialed. In the example configuration in FIG. 3, the main module is for an event gate, and is designated in FIG. 3 as "event gate". When the main module 304 is initiated, a configuration parser module 306 and an invoke worker module 308 are spawned. Main module 304 is the master process within an event gate and responsible for starting configuration parser module 306 and invoke worker module 308. In some embodiments, main module 304 delegates tasks, based upon a configuration file, to all other modules within the event gate. In some embodiments, this start up is performed sequentially. In some embodiments, the startup is performed concomitantly. In some embodiments, main module 304 is configurable through an event gate template for the event gate's data source and data sink. In some embodiments, an event gate template is an open standard file format and data interchange format that uses human-readable text to store and transmit data objects consisting of attribute—value pairs and arrays (or other serializable values). In some embodiments, an event gate template is a data format with a diverse range of functionality in data interchange including communication of web applications with servers.

Configuration parser sub-module 306 queries a database, e.g., the master database 120 or cache database 130 for a defined configuration. In some embodiments, configuration parser module 306 parses a configuration file inputted by a user, e.g., through the API server 140. In some embodiments, the configuration file defines the number of data sources and the configuration of each data source and the configuration of every event consumers 316A-316C that is to be spawned by invoke worker module 308. In some embodiments, the configuration file includes a predefined data source and data sink. In some embodiments, the configuration file is inputted, modified, and controlled by a user. In some embodiments, the user inputs, modifies, and controls the configuration file in real time or runtime, as described herein. In some embodiments, invoke worker module 308 is configured to change, in runtime, at least one of a configuration or a number of the one or more processing modules, e.g., event consumers 316, in response to a change of the configuration file.

In some embodiments, based on a number of data sources and data sinks, configuration parser module 306 forwards to invoke worker module 308 an instruction to spawn multi-processing workers or event consumer modules 316A, 316B, 316C. Although three event consumer modules are shown in the example of FIG. 3, any other number of event consumer modules (herein referred to as event consumers 316) is possible.

It should be noted that FIG. 3 illustrates different event sinks for the event consumers 316, depending on the type of the component 300. For example, when the component 300 is an event gate, all event consumers 316 have one or more shared queues as their sinks, as exemplarily illustrated for event consumer 316A and event queue 106. When the component 300 is an event writer, all event consumers 316 have a database as their sink, as exemplarily illustrated for event consumer 316C and event data section 122 of master database 120. When the component 300 is an event dispatcher, all event consumers 316 have one or more data output(s) as their sink(s), as exemplarily illustrated for event consumer 316B and API server 140. The API server 140 as a sink of the event consumers 316 in an event dispatcher is an example. Other sinks for event consumers 316 of an event dispatcher are within the scopes of various embodiments. In some embodiments, a configuration of an event writer or an event dispatcher is similar to the configuration for an event gate, as described herein, except for the sink(s) of the event consumers 316.

In some embodiments, configuration parser module 306 is a data model parser that parses the configuration file. In some embodiments, a data model parser is primarily a parsing library and not a validation library. In other words, a data model parser assures the types and constraints of the output model, not the input data based on the configuration file. In some embodiments, all parameters are obtained and set based upon the configuration file. In some embodiments, the configuration file details all read, write and execute permissions for main module 304, invoke worker module 308 and event consumers 316.

In some embodiments, event consumers 316 write event frames to a shared queue, e.g., first event queue 106. In some embodiments, a unique event identification is added to every event frame. In some embodiments, every event consumer 316 has a unique identification. In some embodiments, one or more event consumers 316 are disabled, refreshed or suspended based upon the unique identification. In some embodiments, each event consumer allows for multiple data sources and customized configurations. In some embodiments, based on the configuration file, event consumers 316 will consume event messages from the configuration file designated data source and send the event message to the data sink, e.g., a shared queue for the event gate.

In some embodiments, the invoke worker module 308 spawns event logger module (also referred to as event logger) 322 which logs information to a file by a file writer module (also referred to as file writer) 326, and/or one or more disqualification (DLQ) consumer modules 324 which take any event that creates an error by event consumers 316 and consumes the error creating event. In some embodiments, DLQ consumers 324 create an error log with the error creating event via file writer 326. In some embodiments, file writer 326 maintains rolling logs based on timestamp and size.

In some embodiments, a user is able to add a new event source via the API server 140. In some embodiments, based upon the configuration entered by the user, invoke worker module 308 will specify a configuration to each of event consumers 216. In an example, event consumer 316A is configured to consume multiple sources, event consumers 316B, 316C have the same source. In some embodiments, the configuration for each source is different. In an example, the configuration of an event consumer for a source is set for the event consumer to consume events based on aggregated time window (e.g., batch processing). The configuration of another event consumer for another source is set for the event consumer to consume events one after the other without any windows (e.g., stream processing). In some embodiments, all of event consumers 316 consume events in parallel and send data over shared queue 318 to other modules.

Figure 4:
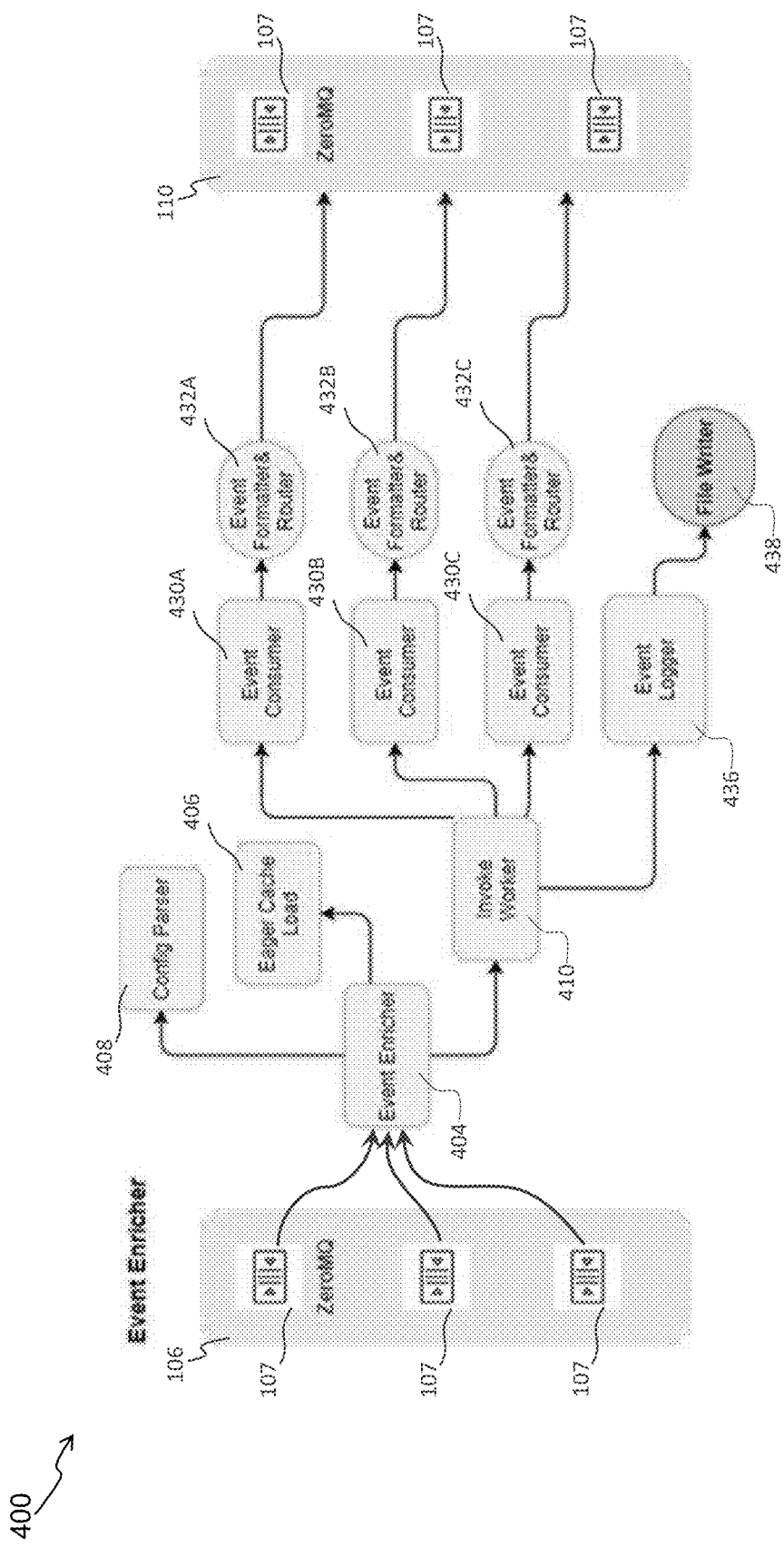
FIG. 4 is a schematic diagram of an event enricher in a CPE system, in accordance with some embodiments.

FIG. 4 is a schematic diagram of an event enricher 400 in a CPE system, in accordance with some embodiments. Corresponding elements in FIGS. 1 and 4 are designated by the same reference numerals. In one or more embodiments, the event enricher 400 corresponds to one or more of event enrichers 108. In at least one embodiment, the event enricher 400 is implemented as software executed by at least one hardware processor. The schematic diagram in FIG. 4 shows the hierarchy of various modules in the event enricher 400.

In some embodiments, event enricher 400 is a part of an EDA or SOA platform. In some embodiments, event enricher 400 enriches incoming event message frame(s). In some embodiments, event enricher 400 further qualifies and classifies, within event formatter and router modules (also referred to as event formatter and routers) 432 as described herein, the event message frame(s) based on the user-defined policy obtained through an Eager cache loader module 406 as described herein. In some embodiments, event enricher 400 is pluggable in nature. In computing, a plug-in (or plugin, add-in, addin, add-on, or addon) is a software component that adds a specific feature to an existing computer program and enables customization. In some embodiments, event enricher 400 are scalable and are configured to be scaled in every use or in runtime. In some embodiments, event enricher 400 quickly enrich event message frame(s) based on multi-layer caching.

The event enricher 400 comprises a main module 404 (designated in FIG. 4 as "event enricher") that is executed when the event enricher 400 is initialed. When the main module 404 is initiated, Eager cache loader module 406, configuration parser module 408, and invoke worker module 410 are spawned. The configuration parser module 408 queries a database, e.g., the master database 120 or cache database 130 for a configuration file. In some embodiments, the configuration file is user-defined and related to technical aspects regarding the data sources, data sinks, and the parameters for event message frame enrichment that are passed downstream. In some embodiments, the configuration parser module 408 is configured to parse the configuration file to all other modules within event enricher 400. In some embodiments, based on the configuration file, invoke worker module 410 spawns one or more event consumer modules 430A, 430B, 430C (herein referred to as event consumers 430), and one or more corresponding event formatter and router modules 432A, 432B, 432C (herein referred to event formatter and routers 432). Although three event consumer modules 430 and three corresponding event formatter and routers 432 are shown in the example of FIG. 4, any other number of corresponding pairs of one event consumer module and one event formatter and router is possible. In some embodiments, the invoke worker module 410 spawns event logger module 436 and file writer module 432, in a manner similar to FIG. 3. The configuration file, and the configuration of the event enricher 400, are modifiable by user in runtime, as described herein.

In some embodiments, Eager cache loader module 406 is configured to obtain additional data, e.g., business layer data from the cache database 130, and provide to event formatter and router modules 432. In some embodiments, the event message frame(s) are enriched or supplemented with the additional data or business logic and thus present more information within the event message frame(s) regarding the event message(s). In some embodiments, event formatter and router modules 432 perform the enrichment and classify the event message frame(s) as per the configuration file. In some embodiments, event formatter and router(s) 432 format particular event message frame(s) to a readable format for a data sink (e.g., the second event queue 110) to consume. In some embodiments, event formatter and router(s) 432 route the enhanced event message frame(s) as provided by the configuration file. In some embodiments, event formatter and router module 432 performs enriching of event message frame(s), classification of event message frame(s), and routing of the event message frame(s). In some embodiments, event formatter and router module 432 enriches or adds any additional data to event message frame(s) that are consumed by event consumer(s) 430. In some embodiments, any change made to the business layer data or technical layer data, for example by a user through the API server 140, is made in real time, on the fly, and reflected in the master database 120 and/or cache database 130. The updated business layer data are applied to all upcoming event message frame(s) in real time.

In some embodiments, for a particular set of user policy based filters, event formatter and router modules 432 determine whether event message frame(s) are part of a particular policy or not. In some embodiments, the filtering is performed in order to make sure a user policy has been applied for a particular entity message frame(s) having set number of filters.

In a non-limiting example, a user policy (e.g., P1) is applicable for a set of domains (e.g., a radio access network (RAN), CORE (the high capacity communication facility that connects primary communications nodes)) and a location (e.g., Tokyo, Kanagawa, and Nagoya) that takes action on an entity message frame. In some embodiments, P1 is a set of filters for a network function. In response to an event message frame that arrives in a stream, based on the business data layer, the business data entity is identified as belonging to a location (e.g., Chiba). However, since the policy P1 defines action to be taken on entities that belong to other locations (e.g., Tokyo, Kanagawa, and Nagoya), this event message frame will be classified as not part of policy P1.

In another non-limiting example, the user defines a user policy for all locations: with a regular expression (regex) that considers all the locations. Any event for any location will be classified as part of this policy considering only a single filter of location. In some embodiments, after all user policy filters are satisfied with the enriched event information, that event message frame is considered as part of that policy. In some embodiments, a single event message frame is part of multiple such policies as well. In some embodiments, after the event message frame(s) are classified, the enriched event message frame(s) is routed based upon user policy.

In some embodiments, an event message frame(s) that has a topological root with network service and is classified as part of P1 is sent to a particular sink partition. In some embodiments, the partitioning of event message frame(s) based on routing policy ensures that a set of events are driven to a defined sink. In some embodiments, this ensures that event message frame(s) are computed at the sink end in a sequential manner to avoid parallel processing between the sinks. In some embodiments, this avoids unnecessary usage and locking of shared data between the sinks.

In some embodiments, a consumer module 430 sends an event message frame(s) to the corresponding event formatter and router module 432 which obtains topological data regarding the event message frame(s) from the cache database. In some embodiments, the event formatter and router module 432 enriches the event message frame(s) with the topological data returned from the cache database.

Figure 5:
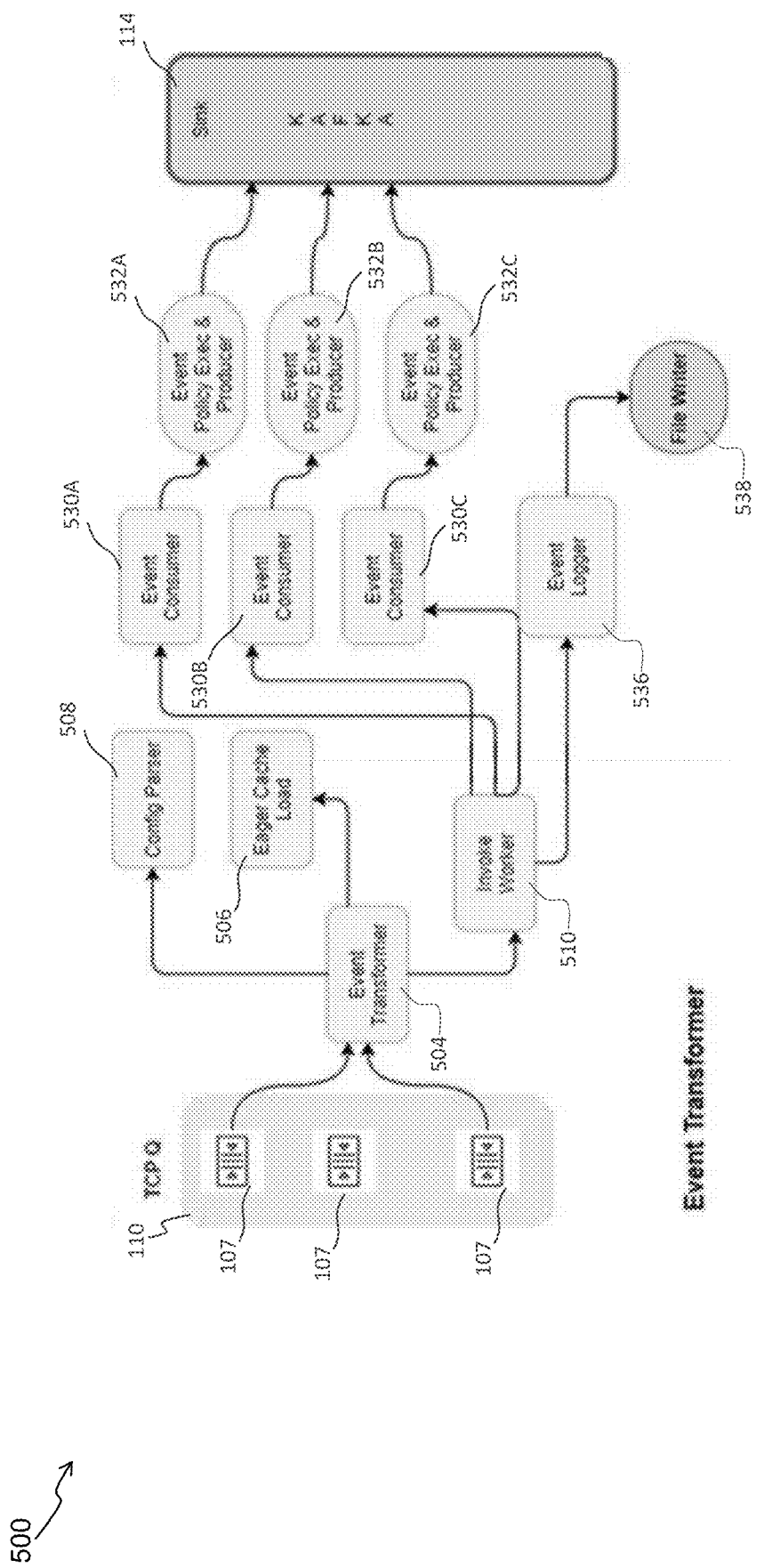
FIG. 5 is a schematic diagram of an event transformer in a CPE system, in accordance with some embodiments.

FIG. 5 is a schematic diagram of an event transformer 500 in a CPE system, in accordance with some embodiments. Corresponding elements in FIGS. 1 and 5 are designated by the same reference numerals. In one or more embodiments, the event transformer 500 corresponds to one or more of event transformers 112. In at least one embodiment, the event transformer 500 is implemented as software executed by at least one hardware processor. The schematic diagram in FIG. 5 shows the hierarchy of various modules in the event transformer 500.

In FIG. 5, the main module 504 (designated as "event transformer"), Eager cache loader module 506, configuration parser module 508, invoke worker module 510, event consumer modules 530A-530C and corresponding event policy executer and producer modules 532A-532C, event logger module 536 and event writer 538 are initiated, spawned, configured, and/or operated in manner similar to those described in FIG. 4 with respect to main module 404, Eager cache loader module 406, configuration parser module 408, invoke worker module 410, event consumer modules 430A-530C and corresponding event formatter and router modules 432A-532C, event logger module 436 and event writer 438. In some embodiments, operations of the event transformer 500 are similar to those described with respect to FIG. 2B.

In some embodiments, qualified policy definitions are available in Eager cache load module 506 as defined by the business policies. In some embodiments, event message frames are processed by event policy executer and producer modules 532 using CEP or pattern matching. In some embodiments, event policy executer and producer modules 532 perform one or more operations one the even message frames such as mapping, filtering, windowing, interpolation, reduction, accumulation or aggregation. In some embodiments, based on the applied policy, notification of rejection or success is generated for the set of event frames. In some embodiments, the transformed event frames are sent to the event sink 114.

In some embodiments, event transformer 500 receives events and correlates the events with respect to rules in policies. In some embodiments, event transformer 500 is connected to an event enricher to receive enriched (e.g., event frames supplemented with related events and data) events that are further correlated to the policies through the business data layer. That is, the original event frame and the additional events coupled with the original event frame are also correlated with policies based on the business data layer. In some embodiments, for the rule-based policies, a correlation is based on the rules (such as a user/vendor implementing a proprietary model into event transformer 500). In some embodiments, the rule-based policies are plugged into the event transformer 500 to make the correlations. In some embodiments, the correlation assists in defining actions. In some embodiments, for rule-based policies, actions are the decisions which are further propagated to the next component in the CPE system.

In some embodiments, examples of policies include rule based policies where a user/vendor apply complex policies which are series of patterns embedded within each other. An example pattern comprises event A occurring 2 times, followed by event B occurring at least once, followed by event C occurring not more than 5 times with the entire pattern within a window period of 5 minute. In other words, A=2, B>1, C<=5 is an example of a complex pattern, with multiple use cases where A, B, and C are events. In some embodiments, using complex event processing, policy is solved by the event transformer 500. In some embodiments, event transformer 500 uses multiple libraries which when exposed to the user, are a plug and play type system where a user groups events, or maps events to various functionalities, and these actions are part of the policy.

In some embodiments, policies are of another type such as alarm clearance type policies where when system is repaired or operate properly, a clearance alarm is activated. In some embodiments, CEP complex event-based policies are implemented. In some embodiments, change management system policies are used when actions are not to be taken on a network system. In some embodiments, a policy includes an anomaly detection system within a particular constraint (e.g., window time, with respect to states in the system) when any anomalous event is detected, appropriate action is taken.

Figure 6:
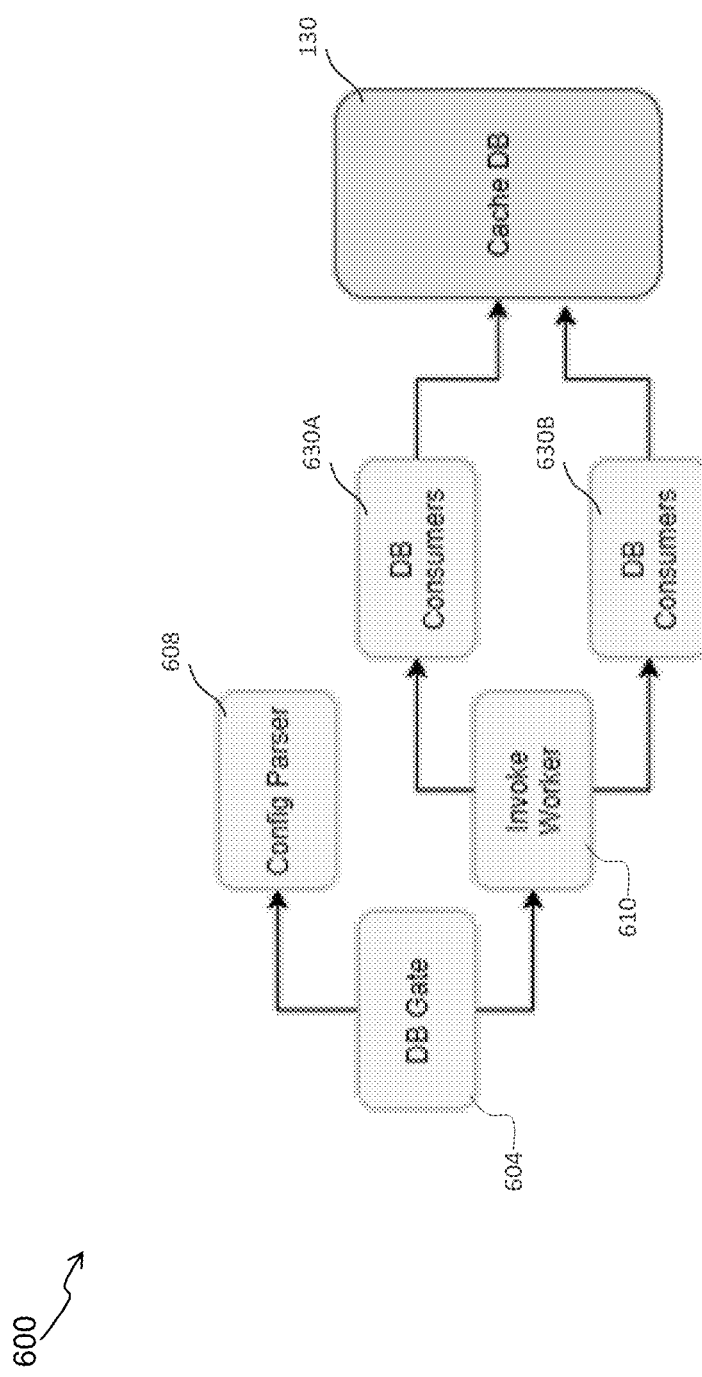
FIG. 6 is a schematic diagram of a database synch module in a CPE system, in accordance with some embodiments.

FIG. 6 is a schematic diagram of a database synch module 600 in a CPE system, in accordance with some embodiments. Corresponding elements in FIGS. 1 and 6 are designated by the same reference numerals. In one or more embodiments, the database synch module 600 corresponds to one or more of DB2Cache modules 138. In at least one embodiment, the database synch module 600 is implemented as software executed by at least one hardware processor. The schematic diagram in FIG. 6 shows the hierarchy of various modules in the memory device 600.

In FIG. 6, the main module 604 (designated as "DB gate"), configuration parser module 608, invoke worker module 610, DB consumer modules 630A, 630B are initiated, spawned, configured in manner similar to those described in FIG. 4 with respect to main module 404, configuration parser module 408, invoke worker module 410, event consumer modules 430. A difference is that DB consumer modules 630A, 630B are operable to synch the master database 120 with the cache database 130 (in either direction) instead of consuming events. The database synch module 600 is modifiable in runtime, e.g., by the API server 140, as described herein.

Figure 7:
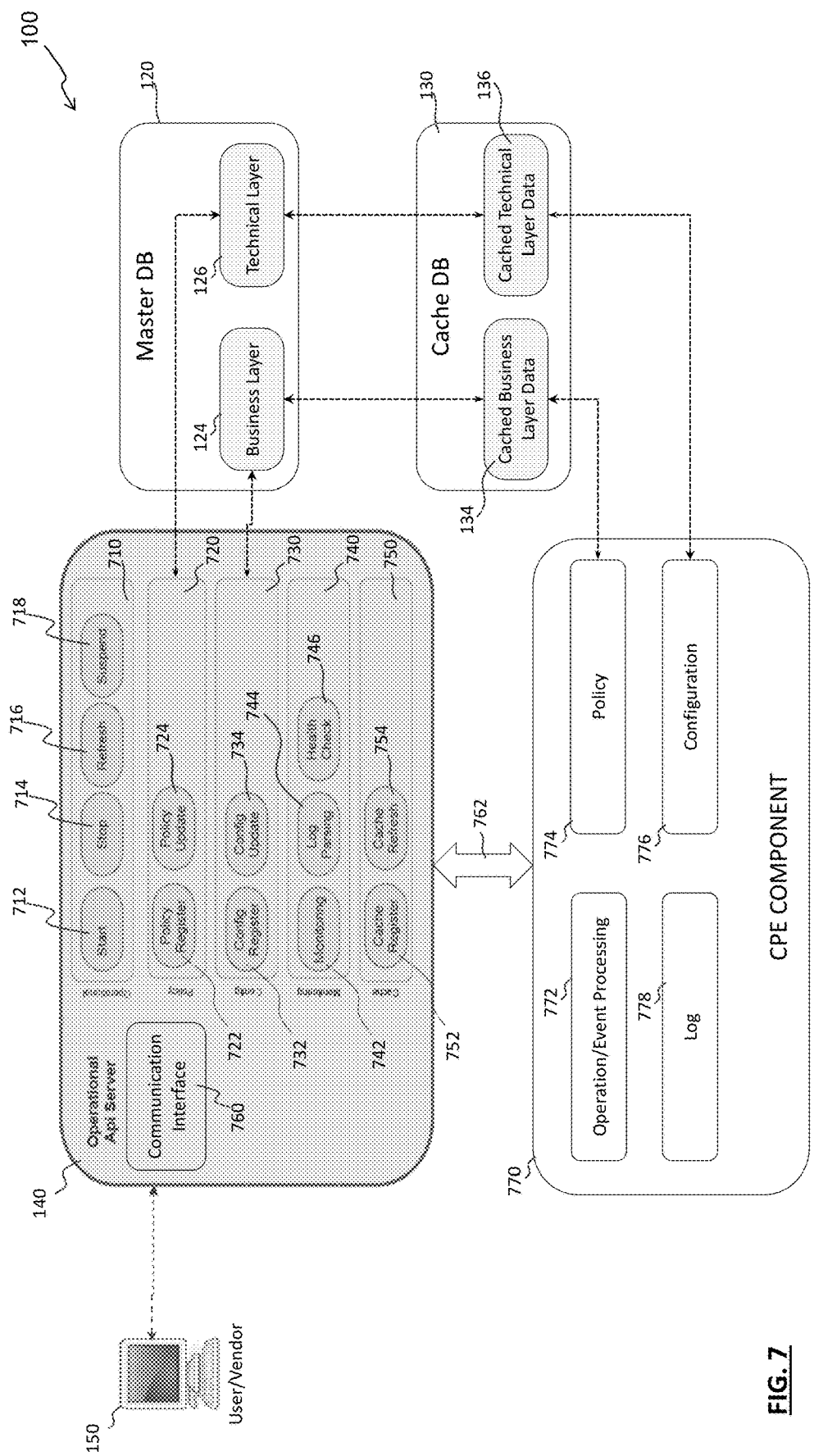
FIG. 7 is a schematic diagram of a portion of a CPE system including an application programming interface (API) server, in accordance with some embodiments.

FIG. 7 is a schematic diagram of a section of the CPE system 100 including the API server 140, in accordance with some embodiments. Corresponding elements in FIGS. 1 and 7 are designated by the same reference numerals. In at least one embodiment, the API server 140 is implemented as software executed by at least one hardware processor.

The section of the CPE system 100 illustrated in FIG. 7 comprises the master database 120, the cache database 130 and a CPE component 770. For simplicity, the DB2Cache modules 138 between the master database 120 and cache database 130, and the event data section 122 in the master database 120 are omitted in FIG. 7. In at least one embodiment, the CPE component 770 corresponds to at least one of the event source 102, event gate 104, first event queue 106, event enricher 108, second event queue 110, event transformer 112, event sink 114, event writer 116, event dispatcher 118, DB2Cache module 138.

The API server 140 comprises a plurality of API layers each comprising a set of APIs corresponding to a plurality of functions that enable the user/vendor 150 to control, configure or interact with the CPE system 100 in runtime. In the example configuration in FIG. 7, the plurality of API layers of the API server 140 comprises an operational layer 710, a policy layer 720, a configuration layer 730, a monitoring layer 740, and a cache layer 750. In at least one embodiment, one or more of the described API layers 710-750 is/are omitted. The described API layers 710-750 are examples, and other API layers are within the scopes of various embodiments. The API layers 710-750 comprise corresponding sets of APIs described herein. In at least one embodiment, each API in each of the API layers 710-750 is implemented by one or more hardware processors executing corresponding software or programs.

The API server 140 further comprises communication interface 760 configured to communicate with the user/vendor 150. Examples of the communication interface 760 include, but are not limited to, a hardware bus, cellular communication circuitry, a network interface, a software bus, or the like. The API server 140 is coupled to the other components of the CPE system 100 by one or more connections. A representative connection 762 is illustrated in FIG. 7, between the API server 140 and the CPE component 770. Additional, similar connections (not shown) are provided among the API server 140, the master database 120, the cache database 130, the CPE component 770. In at least one embodiment, the connections among components of the CPE system 100 are implemented by one or more hardware buses, cellular communication circuitry, network interfaces, software buses, or the like.

The CPE component 770 comprises operation/event processing module 772, at least one policy 774, configuration data 776, and a log 778. In at least one embodiment, the at least one policy 774, configuration data 776, and log 778 are stored in a non-transitory computer-readable medium as described herein. In at least one embodiment, the operation/event processing module 772 is implemented by one or more hardware processors executing corresponding software or programs.

In some embodiments, user-defined policies are input by the user/vendor 150 into the API server 140 via the communication circuitry 760. The user-defined policies are processed and forwarded by the policy layer 720 to the master database 120 to be stored at the business layer 124. The cache database 130 is synchronized, e.g., by one or more DB2Cache modules, with the master database 120, obtains and stores a cached version of the user-defined policies as cached business layer data 134. In some embodiments, the cached business layer data 134 comprise policies for multiple CPE components of the CPE system 100. Each of the CPE components is configured to access the cached business layer data 134 to retrieve the corresponding policy applicable to that CPE component. For example, the CPE component 770 is configured to access the cached business layer data 134 to retrieve the corresponding at least one policy 774. Alternatively, the cache database 130 is configured to push corresponding policies to at least one of the CPE components of the CPE system 100.

Similarly, user-define technical layer data are input by the user/vendor 150 into the API server 140 via the communication circuitry 760. The user-defined technical layer data are processed and forwarded by the configuration layer 730 to the master database 120 to be stored at the technical layer 126. The cache database 130 is synchronized, e.g., by one or more DB2Cache modules, with the master database 120, obtains and stores a cached version of the user-defined technical layer data as cached technical layer data 136. In some embodiments, the cached technical layer data 136 comprise configuration data for multiple CPE components of the CPE system 100. Each of the CPE components is configured to access the cached technical layer data 136 to retrieve the corresponding configuration data applicable to that CPE component. For example, the CPE component 770 is configured to access the cached technical layer data 136 to retrieve the corresponding configuration data 776. Alternatively, the cache database 130 is configured to push corresponding configuration data to at least one of the CPE components of the CPE system 100.

The operation/event processing module 772 is configured to perform a corresponding processing on the event data input to the CPE component 770 by executing functions of the CPE component 770, using the at least one policy 774 and the configuration data 776. Log data about operations or functions of the operation/event processing module 772 are generated by the operation/event processing module 772 and stored in the log 778.

In some embodiments, the configuration data 776 define technical aspects including, but not limited to, one or more data sources, one or more data sinks, one or more parameters for one or more operations to be performed by the operation/event processing module 772, a number of instances of the operation/event processing module 772 to be executed at the same time, or the like. In an example, when the CPE component 770 corresponds to an event gate 104, the configuration data 776 indicate one or more event sources 102 as data sources, one or more shared queues 107 in the first event queue 106 as data sinks, and one or more parameters based on which the operation/event processing module 772 is configured to group event messages into frames, as described herein. A number of the event gates 104 to be instantiated or executed is also determined by the configuration data 776, for example, based on the number of data sources and/or data sinks. In another example, when the CPE component 770 corresponds to an event enricher 108, the configuration data 776 indicate one or more shared queues 107 in the first event queue 106 as data sources, one or more shared queues 107 in the second event queue 110 as data sinks, and one or more parameters based on which the operation/event processing module 772 is configured to enrich the event message frames, as described herein. A number of the event enrichers 108 to be instantiated or executed is also determined by the configuration data 776, for example, based on the number of data sources and/or data sinks. In yet another example, when the CPE component 770 corresponds to an event transformer 112, the configuration data 776 indicate one or more shared queues 107 in the second event queue 110 as data sources, one or more event sinks as data sinks, and one or more parameters based on which the operation/event processing module 772 is configured to transform the enriched event message frames, as described herein. A number of the event transformers 112 to be instantiated or executed is also determined by the configuration data 776, for example, based on the number of data sources and/or data sinks.

In some embodiments, the at least one policy 774 defines one or more rules and/or business data to be applied to the event data and/or event message frames by the operation/event processing module 772. In an example, when the CPE component 770 corresponds to an event gate 104, the at least one policy 774 defines one or more rules indicating which event messages are to be grouped by the operation/event processing module 772, and into which event message frames. In another example, when the CPE component 770 corresponds to an event enricher 108, the at least one policy 774 defines which business data (e.g., of a consumers) to be added to an event message frame. In at least one embodiment, the business data to be added to the event message frame are retrieved by the operation/event processing module 772 from the business layer 124 via the cached business layer data 134. In yet another example, when the CPE component 770 corresponds to an event transformer 112, the at least one policy 774 defines one or more rules which, when satisfied by the event data and/or the enriched event message frame, cause a trigger or notification to be generated, as described herein.

In some embodiments, the at least one policy 774 and/or configuration data 776 are inputted, modified, and controlled by the user/vendor 150 through the API server 140 in real time and/or in runtime. As a result, in at least one embodiment, it is possible to for a user or vendor to reconfigure, scale up or down, control, monitor or interact with the CPE system 100 in runtime, in response to the user or vendor's input. In some embodiments, inputs from the user/vendor 150 are automatically generated by user/vendor equipment, e.g., a network device or a computer system. In one or more embodiments, inputs from the user/vendor 150 are manually provided by, or provided in response to an action of, a human operator.

The operational layer 710 of the API server 140 comprises a plurality of operational APIs including Start API 712, Stop API 714, Refresh API 716, Suspend API 718. The described APIs of the operational layer 710 are examples, and other APIs for the operational layer 710 are within the scopes of various embodiments. In some embodiments, the APIs of the operational layer 710 are configured to enable the user/vendor 150 to control each or any component of the CPE system 100 individually. In some embodiments, each of the event gate 104, event enricher 108, event transformer 112, event writer 116, event dispatcher 118, business layer 124, technical layer 126, DB2Cache module 138, cache database 130, or the like, is operable individually and/or independently from other components of the CPE system 100 by operating a corresponding API of the operational layer 710. For example, the Start API 712 is configured to enable the user/vendor 150 to execute a start operation to instantiate an event gate 104, while the Stop API 714 is configured to enable the user/vendor 150 to execute a stop operation to close and/or terminate the event gate 104. For another example, in some situations where an event enricher 108 is not needed to enrich the event data or frames, the event enricher 108 is simply turned off, e.g., via the Stop API 714. For a further example, the Refresh API 716 is configured to enable the user/vendor 150 to restart the process of a desired component, such as an event enricher 108. For yet another example, the Suspend API 718 is configured to enable the user/vendor 150 to temporarily suspend, or pause, the process of a desired component, such as an event gate 104. In contrast to the Stop API 714 which completely kills or terminates the process of the desired component, the Suspend API 718 pauses but does not kill or terminate the process of the desired component. For a further example, during ticket/change management, there are situations where the CPE system 100 is not needed, and therefore, instead of controlling via a robin environment, it is possible to control at the process level. The operational layer 710 exposes the corresponding APIs to create events on various components of the CPE system 100 such as the event gate 104, event enricher 108, event transformer 112. These events hold signature of the corresponding Start, Stop, Refresh and/or Suspend APIs. In one or more embodiments, the operational layer 710 makes it possible to perform various operations with respect to different components to create a dynamic architecture of the CPE system 100.

The policy layer 720 of the API server 140 comprises a plurality of policy APIs including Policy Register API 722, Policy Update API 724. The described APIs of the policy layer 720 are examples, and other APIs for the policy layer 720 are within the scopes of various embodiments. In some embodiments, the APIs of the policy layer 720 are configured to enable the user/vendor 150 to register, remove, update various policies and/or business data, with support for all CRUD operations. For example, the Policy Register API 722 is configured to enable the user/vendor 150 to register a new policy, while the Policy Update API 724 is configured to enable the user/vendor 150 to update or remove an existing policy. In at least one embodiment, policies include entities, define which action needs to be taken, define various conditions which need to be fulfilled and what type of data is needed to validate these condition against. In some embodiments, refresh events or externally created events for multi layered correlation are added to the CPE system 100 via the policy layer 720. The policy layer 720 exposes the corresponding APIs to perform registering, removing or updating a policy to be applied by at least one component of the CPE system 100 to the event data when the at least one component performs corresponding processing on the event data. In some embodiments, the policy being registered, removed or updated comprises at least one of one or more actions to be taken by the corresponding component with respect to the event data, one or more conditions to be fulfilled before the one or more actions are taken by the corresponding component, or one or more types of event data against which the one or more conditions are to be validated. In some embodiments, any policy of any one or more components that needs to be inputted or updated during the runtime is simply added to the CPE system 100 via the API server 140 in response to user input from user/vendor 150.

The configuration layer 730 of the API server 140 comprises a plurality of configuration APIs including Configuration Register API 732, Configuration Update API 734. The described APIs of the configuration layer 730 are examples, and other APIs for the configuration layer 730 are within the scopes of various embodiments. In some embodiments, the APIs of the configuration layer 730 are configured to enable the user/vendor 150 to register, remove, update various configuration data, with support for all CRUD operations. For example, the Configuration Register API 732 is configured to enable the user/vendor 150 to register a new configuration of a component in the CPE system 100, while the Configuration Update API 734 is configured to enable the user/vendor 150 to update or remove an existing configuration. In some embodiments, the configuration layer 730 is configured to enable registering, removing or updating a configuration of at least one component among the plurality of components of the CPE system 100, and/or to enable changing a number of components (e.g., the number of event gates 104) of a same component type (e.g., event gate) among various component types, to scale up or down the CPE system 100. In at least one embodiment, when a configuration of a component of the CPE system 100 is created, updated or deleted, the configuration layer 730 is configured to multicast that information to one or more components that are coupled to or related to the component having the created, updated or deleted configuration. For example, the multicast information comprises the registered, removed or updated configuration of the component (e.g., event gate 104), and/or the changed number of components (e.g., number of event gates 104) of the same component type.

The configuration layer 730 exposes APIs to create, update or delete configurations of one or more components of the CPE system 100. In an example, by creating, updating or removing a configuration of a component, e.g., event gate 104, it is possible to scale the event gate 104 up from one instance to multiple instances, or scale the event gate 104 down to a fewer number of instances, or to change the data source (e.g., event sources 102) or data sink (e.g., shared queues 107 in the first event queue 106). In a further example, a configuration for an event enricher 108 is configured to enable the event enricher 108 to communicate with, and retrieve business data for enrichment from, multiple business data layers. In another example, any particular technical configuration of any one or more components that needs to be inputted or updated during the runtime is simply added to the CPE system 100 via the API server 140 in response to user input from user/vendor 150. In yet another example, creating, updating or removing one or more configurations of one or more components of the CPE system 100 make it possible to change a flow of event data through the CPE system 100, as described herein.

The monitoring layer 740 of the API server 140 comprises a plurality of monitoring APIs including Monitoring API 742, Log Parsing API 744, Health Check API 746. The described APIs of the monitoring layer 740 are examples, and other APIs for the monitoring layer 740 are within the scopes of various embodiments. In some embodiments, the APIs of the monitoring layer 740 are configured to enable the user/vendor 150 to perform at least one of monitoring, log parsing, or health check for at least one or any component of the CPE system 100. For example, the Monitoring API 742 is configured to enable the user/vendor 150 to input and monitor a particular logic for correlating between logs, such as "Event-Policy Based Correlation." Various metrics monitorable by the Monitoring API 742 include, but are not limited to, how many times a particular policy has enacted, how many times was the policy successful or failed, or the like. For a further example, the Log Parsing API 744 is configured to enable the user/vendor 150 to search for particular information, such as, whether the events from a data source to a data sink were reconciled correctly or not, whether the events got enriched correctly or not, or whether the CPE system 100 behaved correctly during a condition evaluation or not. For another example, the Health Check API 746 is configured to enable the user/vendor 150 to interactively obtain the runtime status of each process of every individual module (or component) in the CPE system 100. The monitoring layer 740 exposes APIs that help the user/vendor 150 to monitor the CPE system 100, to search for log information, and to check the process status or health.

The cache layer 750 of the API server 140 comprises a plurality of cache APIs including Cache Register API 752, Cache Refresh API 754. The described APIs of the cache layer 750 are examples, and other APIs for the cache layer 750 are within the scopes of various embodiments. In some embodiments, the APIs of the cache layer 750 are configured to enable the user/vendor 150 to interact with the cache database 130 and/or to keep the cache database 130 consistent. In an example, the Cache Register API 752 is configured to enable cache registering. The cache registering comprises directly registering at least one of a policy or a configuration of at least one component of the CPE system 100 in the cache database 130. The cache registering further comprises updating a persistent database, e.g., the master database 120, of the CPE system 100 with the at least one policy or configuration directly registered in the cache database 130. In a further example, the Cache Refresh API 754 is configured to enable cache refreshing. The cache refreshing comprises rewriting the cache database 130 with business layer data and/or technical layer data from the persistent database, e.g., the master database 120, of the CPE system 100. The cache refreshing further comprises causing the components of the CPE system 100 to reload corresponding policies and/or business data from the cached business layer data 134 rewritten in the cache database 130, and/or to reload corresponding configurations from the cached technical layer data 136 rewritten in the cache database 130. Examples of cache registering and cache refreshing are further described with respect to FIG. 3A. In some embodiments, the cache layer 750 is further configured to enable other operational activities, including, but not limited to, manual update, reconcile, invalidation of data into the cache database 130. The cache layer 750 exposes APIs to interact with the cache database 130, where these APIs provide interfaces to keep the cache database 130 consistent, to support manual update, reconcile, and invalidate data into the cache database 130. In some embodiments, the APIs of the API layers 710-750 are configured to enable interactions with the components of the CPE system 100 in runtime and in response to user input from the user/vendor 150.

The described methods and algorithms include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

Figure 8:
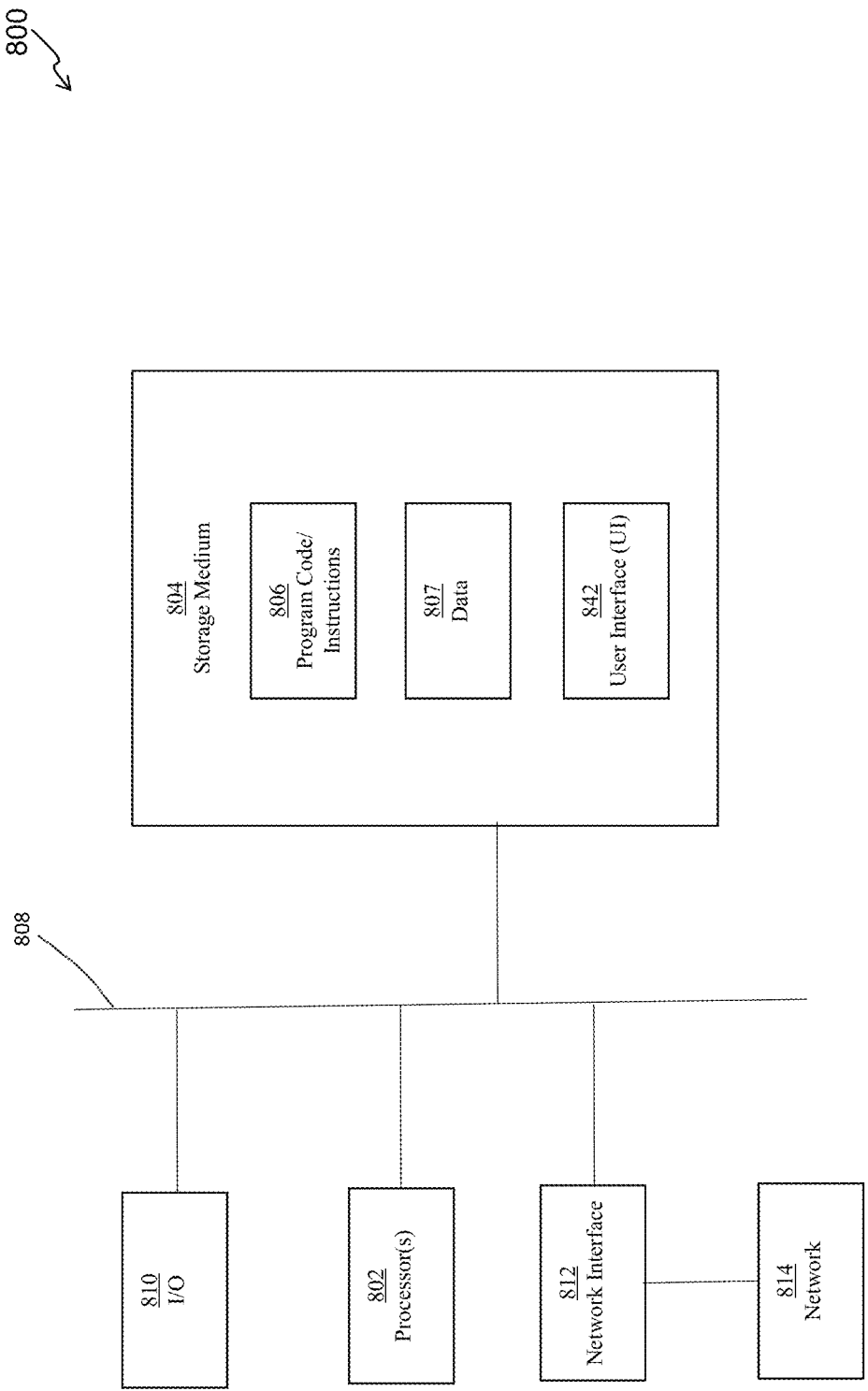
FIG. 8 is a schematic block diagram of a computer system, in accordance with some embodiments.

FIG. 8 is a schematic block diagram of a computer system 800, in accordance with some embodiments. In one or more embodiments, the computer system 800 is an example configuration of one or more CPE components as described herein, including, but not limited to, an API server, a database such as a master database and/or a cache database, an event source, an event gate, an event queue, an event enricher, an event transformer, an event sink, an event writer, an event dispatcher, or the like.

The computer system 800 includes a hardware processor 802 and a non-transitory, computer-readable storage medium 804. Storage medium 804, amongst other things, is encoded with, i.e., stores, computer program code 806, i.e., a set of executable instructions, such as one or more algorithms, programs, applications, sets of executable instructions for a correlation engine and policy manager, or the like, as described with respect to one or more of FIGS. 1-7. Execution of instructions 806 by hardware processor 802 implements a portion or all of the methods described herein in accordance with one or more embodiments (hereinafter, the noted processes and/or methods).

Processor 802 is coupled to non-transitory computer-readable storage medium 804 via a bus 808. Processor 802 is also coupled to an I/O interface 810 by bus 808. A network interface 812 is connected to processor 802 via bus 808. Network interface 812 is connected to a network 814, so that processor 802 and computer-readable storage medium 804 are connectable to external elements or devices via network 814. Processor 802 is configured to execute computer program code 806 encoded in computer-readable storage medium 804 in order to cause computer system 800 to be usable for performing a portion or all of the noted processes and/or methods. In one or more embodiments, processor 802 comprises a central processing unit (CPU), a multi-processor, a distributed processing system, an application specific integrated circuit (ASIC), and/or a suitable hardware processing unit.

In one or more embodiments, computer-readable storage medium 804 comprises an electronic, magnetic, optical, electromagnetic, infrared, and/or a semiconductor system (or apparatus or device). For example, computer-readable storage medium 804 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 804 includes a compact disk-read only memory (CD-ROM), a compact disk-read/write (CD-R/W), and/or a digital video disc (DVD).

In one or more embodiments, storage medium 804 stores computer program code 806 configured to cause computer system 800 to be usable for performing a portion or all of the noted processes and/or methods. In one or more embodiments, storage medium 804 also stores information or data 807, such as event data, consumer data, business data, policies, component configurations or the like, used in a portion or all of the noted processes and/or methods.

I/O interface 810 is coupled to external circuitry. In one or more embodiments, I/O interface 810 includes a keyboard, keypad, mouse, trackball, trackpad, touchscreen, and/or cursor direction keys for communicating information and commands to processor 802. Computer system 800 is configured to receive information through I/O interface 810. The information received through I/O interface 810 includes one or more of instructions, data, policies, configurations and/or other parameters for processing by processor 802. The information is transferred to processor 802 via bus 808. Computer system 800 is configured to receive information related to a user interface through I/O interface 810. The information is stored in computer-readable storage medium 804 as user interface (UI) 842.

Network interface 812 allows computer system 800 to communicate with network 814, to which one or more other computer systems are connected. Network interface 812 includes wireless network interfaces such as BLUETOOTH, WIFI, WIMAX, GPRS, LTE, 5G, 6G, WCDMA, or the like; or wired network interfaces such as ETHERNET, USB, IEEE-864 or the like. In one or more embodiments, a portion or all of noted processes and/or methods, is implemented in two or more computer system 800.

In some embodiments, a portion or all of the noted processes and/or methods is implemented as a standalone software application for execution by one or more hardware processors. In some embodiments, a portion or all of the noted processes and/or methods is implemented as a software application that is a part of an additional software application. In some embodiments, a portion or all of the noted processes and/or methods is implemented as a plug-in to a software application.

In some embodiments, a portion or all of the noted processes and/or methods is realized as functions of a program stored in a non-transitory computer readable recording medium. The non-transitory computer readable recording medium having the program stored therein is a computer program product. Examples of a non-transitory computer-readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, or the like.

In some embodiments, a correlation engine and policy manager (CPE) system, comprises: a persistent database configured to store business layer data, a cache database configured to cache the business layer data, at least one processor, and at least one memory coupled to the at least one processor and configured to store executable instructions that, when executed by the at least one processor, cause the at least one processor to provide a plurality of components comprising an event gate, an event enricher, an event transformer, and an event dispatcher. The event gate is configured to obtain event data from at least one event source, and forward the event data to the event enricher. The event enricher is configured to enrich the event data with additional data in the cached business layer data of the cache database, and forward the enriched event data to the event transformer. The event transformer is configured to apply one or more policies in the cached business layer data of the cache database to the enriched event data to obtain transformed event data, and output the transformed event data to be stored in the persistent database. The event dispatcher is configured to, in response to the transformed event data in the persistent database satisfying at least one policy, dispatch output data to cause or prompt an action responsive to the transformed event data satisfying the at least one policy.

In some embodiments, a computer program product comprises a non-transitory, tangible computer readable storage medium storing a computer program that, when executed by at least one processor, causes the at least one processor to provide a plurality of components comprising an event gate, an event enricher, an event transformer, and an event dispatcher. The event gate is configured to obtain event data from at least one event source, and forward the event data to the event enricher. The event enricher is configured to enrich the event data with additional data in business layer data, and forward the enriched event data to the event transformer. The event transformer is configured to apply one or more policies in the business layer data to the enriched event data to obtain transformed event data, and output the transformed event data. The event dispatcher is configured to dispatch output data to cause or prompt an action responsive to the transformed event data satisfying at least one policy. Each component among the plurality of components comprises: a configuration parser module configured to obtain, in technical layer data, a configuration file corresponding to said component, and an invoke worker module configured to, based on the configuration file, create one or more processing modules of said component. The invoke worker module is configured to change, in runtime, at least one of a configuration or a number of the one or more processing modules in response to a change of the configuration file.

In some embodiments, a method performed at least in part by at least one processor of a correlation engine and policy manager (CPE) system comprises: caching business layer data and technical layer data of a persistent database in a cache database; based on the cached technical layer data in the cache database, configuring event gate, an event transformer and an event dispatcher of the CPE system; obtaining, by the event gate, event data from at least one event source; applying, by the event transformer, one or more policies in the cached business layer data of the cache database to the event data to obtain transformed event data; and dispatching, by the event dispatcher, output data to cause or prompt an action responsive to the transformed event data satisfying at least one policy.

The foregoing outlines features of several embodiments so that those skilled in the art better understand the aspects of the present disclosure. Those skilled in the art should appreciate that they readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they make various changes, substitutions, and alterations herein without departing from the spirit and scope of the present disclosure.

What is claimed is:

1. A correlation engine and policy manager (CPE) system, comprising:
   a persistent database configured to store business layer data;
   a cache database configured to cache the business layer data;
   at least one processor; and
   at least one memory coupled to the at least one processor and configured to store executable instructions that, when executed by the at least one processor, cause the at least one processor to provide a plurality of components comprising an event gate, an event enricher, an event transformer, and an event dispatcher, wherein
   the event gate is configured to obtain event data from at least one event source, and forward the event data to the event enricher,
   the event enricher is configured to enrich the event data with additional data in the cached business layer data of the cache database, and forward the enriched event data to the event transformer,
   the event transformer is configured to apply one or more policies in the cached business layer data of the cache database to the enriched event data to obtain transformed event data, and output the transformed event data to be stored in the persistent database, and
   the event dispatcher is configured to, in response to the transformed event data in the persistent database satisfying at least one policy, dispatch output data to cause or prompt an action responsive to the transformed event data satisfying the at least one policy.

2. The CPE system of claim 1, wherein
   the persistent database is configured to store technical layer data,
   the cache database is configured to cache the technical layer data of the persistent database, and
   each of the event gate, the event enricher, the event transformer and the event dispatcher is configured in accordance with the technical layer data cached in the cache database.

3. The CPE system of claim 2, wherein
   the executable instructions, when executed by the at least one processor, further cause the at least one processor to configure an application programming interface (API) server, and
   the API server is configured to perform at least one of
      registering, removing or updating a configuration of at least one component among the plurality of components, or
      changing a number of components of a same component type among the various component types, to scale up or down the CPE system.

4. The CPE system of claim 3, wherein
   the API server is configured to, in response to user input, perform at least one of
      updating at least one of the business layer data or the technical layer data in the persistent database, or
      updating at least one of the cached business layer data or the cached technical layer data in the cache database.

5. The CPE system of claim 2, wherein
   the plurality of components further comprises at least one database synch module, and
   the at least one database synch module is configured to synch the cached business layer data and the cached technical layer data in the cache database correspondingly with the business layer data and the technical layer data of the persistent database.

6. The CPE system of claim 5, wherein
   a number of database synch modules in the at least one database synch module corresponds to an amount of data to be synched between the cache database and the persistent database.

7. The CPE system of claim 2, further comprising at least one of:
   a first event queue to which the event gate is configured to output the obtained event data, and from which the event enricher is configured to obtain the event data,
   a second event queue to which the event enricher is configured to output the enriched event data, and from which the event transformer is configured to obtain the enriched event data,
   an event sink to which the event transformer is configured to output the transformed event data, and from which the transformed event data are to be read and store in the persistent database, or
   an event writer configured to write the transformed event data into the persistent database.

8. The CPE system of claim 2, wherein
   each component among the plurality of components comprises:
      a configuration parser module configured to obtain a configuration file corresponding to said component, from the cached technical layer data in the cache database, and
      an invoke worker module configured to, based on the configuration file, create at least one processing module of said component.

9. The CPE system of claim 8, wherein
   the invoke worker module is configured to, based on the configuration file, create an event logger module configured to maintain a log of operations or data handled by said component.

10. The CPE system of claim 8, wherein
   said component is the event gate, and
   the at least one processing module of the event gate comprises an event gate module adaptable to obtain the event data from event sources of different types, and configured to output the obtained event data to the event enricher.

11. The CPE system of claim 8, wherein
said component is the event enricher,
the event enricher further comprises a cache loader module configured to obtain the additional data from the cached business layer data in the cache database, and
the at least one processing module of the event enricher comprises an event formatter and router module configured to
 enrich the event data with the corresponding additional data obtained by the cache loader module, and
 output the enriched event data to the event transformer.

12. The CPE system of claim 8, wherein
said component is the event transformer,
the event transformer further comprises a cache loader module configured to obtain the one or more policies from the cached business layer data in the cache database,
the at least one processing module of the event transformer comprises an event policy executer and producer module configured to
 apply the corresponding one or more policies obtained by the cache loader module to the enriched event data to obtain the transformed event data, and
 output the transformed event data to be stored in the persistent database.

13. The CPE system of claim 8, wherein
said component is an event writer, and
the at least one processing module of the event writer comprises an event writer module configured to
 read the transformed event data from an event sink to which the event transformer is configured to output the transformed event data, and
 store the transformed event data read from the event sink in the persistent database.

14. The CPE system of claim 8, wherein
said component is the event dispatcher, and
the at least one processing module of the event dispatcher comprises an event dispatcher module configured to
 periodically access the persistent database, and
 dispatch the output data responsive to the transformed event data in the persistent database satisfying the at least one policy.

15. The CPE system of claim 8, wherein
said component is a database synch module, and
the at least one processing module of the database synch module is configured to synch the cached business layer data and the cached technical layer data in the cache database correspondingly with the business layer data and the technical layer data of the persistent database.

16. A computer program product comprising a non-transitory, tangible computer readable storage medium storing a computer program that, when executed by at least one processor, causes the at least one processor to provide:
a plurality of components comprising an event gate, an event enricher, an event transformer, and an event dispatcher, wherein
the event gate is configured to obtain event data from at least one event source, and forward the event data to the event enricher,
the event enricher is configured to enrich the event data with additional data in business layer data, and forward the enriched event data to the event transformer,
the event transformer is configured to apply one or more policies in the business layer data to the enriched event data to obtain transformed event data, and output the transformed event data,
the event dispatcher is configured to dispatch output data to cause or prompt an action responsive to the transformed event data satisfying at least one policy, and
each component among the plurality of components comprises:
 a configuration parser module configured to obtain, in technical layer data, a configuration file corresponding to said component, and
 an invoke worker module configured to, based on the configuration file, create one or more processing modules of said component,
 wherein the invoke worker module is configured to change, in runtime, at least one of a configuration or a number of the one or more processing modules in response to a change of the configuration file.

17. The computer program product of claim 16, wherein
the computer program, when executed by the at least one processor, further causes the at least one processor to provide an application programming interface (API) server configured to enable, in runtime, at least one of
 updating the business layer data,
 updating the technical layer data, or
 controlling any component among the plurality of components.

18. The computer program product of claim 16, wherein
the computer program, when executed by the at least one processor, further causes the at least one processor to provide at least one database synch module configured to synch the business layer data and the technical layer data in a persistent database with corresponding cached business layer data and cached technical layer data in a cache database, and
the plurality of components is configured to access the cache database to obtain the corresponding configuration files, the additional data, or the one or more policies.

19. A method performed at least in part by at least one processor of a correlation engine and policy manager (CPE) system, the method comprising:
caching business layer data and technical layer data of a persistent database in a cache database;
based on the cached technical layer data in the cache database, configuring event gate, an event transformer and an event dispatcher of the CPE system;
obtaining, by the event gate, event data from at least one event source;
applying, by the event transformer, one or more policies in the cached business layer data of the cache database to the event data to obtain transformed event data; and
dispatching, by the event dispatcher, output data to cause or prompt an action responsive to the transformed event data satisfying at least one policy.

20. The method of claim 19, wherein at least one of
the event data comprise events occurring during operation of a cellular network, or
the action comprises a corrective action taken in the cellular network.

\* \* \* \* \*